United States Patent [19]

Terashita

[11] Patent Number: 5,353,095

[45] Date of Patent: Oct. 4, 1994

[54] PHOTOGRAPHIC PRINTING APPARATUS AND EXPOSURE CONDITION DETERMINING METHOD

[75] Inventor: Takaaki Terashita, Kanagawa, Japan

[73] Assignee: Fuji Photo Film Co., Ltd., Kanagawa, Japan

[21] Appl. No.: 45,184

[22] Filed: Apr. 13, 1993

[30] Foreign Application Priority Data

Apr. 13, 1992 [JP] Japan .................................. 4-92898
Apr. 20, 1992 [JP] Japan .................................. 4-99447

[51] Int. Cl.$^5$ ............................................. G03B 27/80
[52] U.S. Cl. ......................................... 355/38; 355/77
[58] Field of Search ............................ 355/38, 68, 77; 356/402, 404; 364/525

[56] References Cited

U.S. PATENT DOCUMENTS

| | | | |
|---|---|---|---|
| 4,397,545 | 8/1983 | Terashita | 355/77 |
| 4,830,501 | 5/1989 | Terashita | 356/402 |
| 4,884,102 | 11/1989 | Terashita | 355/77 |
| 4,942,424 | 7/1990 | Terashita et al. | 355/38 |
| 4,974,017 | 11/1990 | Terashita | 355/38 |
| 4,991,972 | 2/1991 | Ikenoue et al. | 364/519 |
| 5,017,014 | 5/1991 | Terashita | 356/404 |
| 5,018,081 | 5/1991 | Yamaguchi et al. | 364/519 |
| 5,023,656 | 6/1991 | Terashita | 355/41 |
| 5,063,407 | 11/1991 | Takagi | 355/68 |
| 5,081,485 | 1/1992 | Terashita | 355/38 |
| 5,101,277 | 3/1992 | Ikenoue et al. | 355/68 |
| 5,148,213 | 9/1992 | Terashita | 355/38 |
| 5,162,841 | 11/1992 | Terashita | 355/38 |
| 5,218,392 | 6/1993 | Sakamoto et al. | 354/106 |
| 5,223,892 | 6/1993 | Ikenoue et al. | 355/77 |
| 5,227,837 | 7/1993 | Terashita | 355/38 |

FOREIGN PATENT DOCUMENTS

| | | |
|---|---|---|
| 55-46741 | 4/1980 | Japan . |
| 63-311241 | 12/1988 | Japan . |
| 290140 | 3/1990 | Japan . |
| 293448 | 4/1990 | Japan . |
| 293449 | 4/1990 | Japan . |

Primary Examiner—Richard A. Wintercorn
Attorney, Agent, or Firm—Sughrue, Mion, Zinn, Macpeak & Seas

[57] ABSTRACT

An image frame to be printed is divided into a plurality of portions, and the portions are photometrically measured. Photometric data necessary to determine an exposure condition is selected. Weighting factors, which are to be applied respectively to selected photometric data, to data obtained from first data obtained by photometric measuring of a plurality of films in accordance with film type identifying codes, and to data determined from second data obtained by photometric measuring of image frames to be printed which are recorded on a single film, are set based on the first data. The exposure condition is determined based on a value obtained by addition of respective weighted data. Hence, influence of color failure can be eliminated, and variations in film characteristics due to deterioration over time and the like can be eliminated. Accordingly, high-quality prints are thereby consistently obtained.

28 Claims, 23 Drawing Sheets

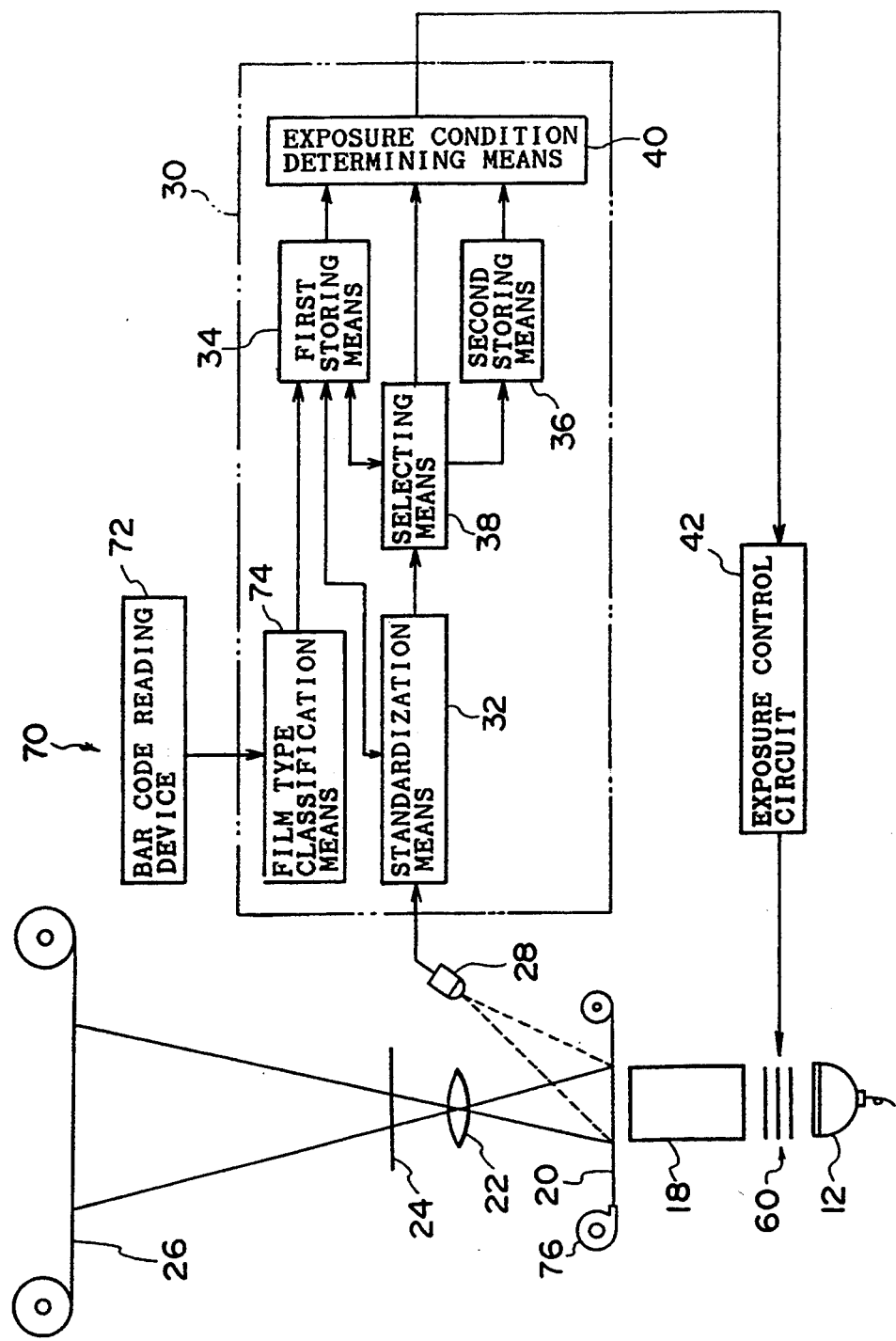

FIG. 21

|   |   |   |   |   |   |   | G'-B' |   |   |   |   |   |
|---|---|---|---|---|---|---|---|---|---|---|---|---|
| 4 | 4 | 4 | 4 | 4 | 4 | 4 | 4 | 4 | 4 | 4 | 2 | 2 |
| 4 | 4 | 4 | 4 | 4 | 4 | 4 | 4 | 3 | 3 | 2 | 2 |
| 4 | 4 | 4 | 4 | 4 | 1 | 1 | 1 | 3 | 3 | 3 | 3 | 2 |
| 4 | 4 | 4 | 4 | 1 | 1 | 1 | 1 | 3 | 3 | 3 | 2 |
| 5 | 4 | 4 | 1 | 1 | 1 | 1 | 1 | 3 | 3 | 3 | 2 |
| 5 | 5 | 4 | 1 | 1 | 1 | 0 | 0 | 1 | 3 | 3 | 2 | 2 |
| 5 | 5 | 5 | 1 | 1 | 0 | 0 | 0 | 0 | 1 | 1 | 2 | 2 |
| 5 | 5 | 5 | 1 | 1 | 0 | 0 | 0 | 0 | 1 | 1 | 2 | 2 | — R'-G'
| 5 | 5 | 5 | 1 | 1 | 1 | 0 | 0 | 1 | 1 | 7 | 7 | 7 |
| 5 | 5 | 5 | 5 | 1 | 1 | 1 | 1 | 1 | 1 | 7 | 7 | 7 |
| 5 | 5 | 5 | 6 | 6 | 1 | 1 | 1 | 1 | 1 | 7 | 7 | 7 |
| 5 | 5 | 6 | 6 | 6 | 6 | 6 | 6 | 6 | 7 | 7 | 7 |
| 5 | 6 | 6 | 6 | 6 | 6 | 6 | 6 | 6 | 7 | 7 |
| 6 | 6 | 6 | 6 | 6 | 6 | 6 | 6 | 6 | 6 | 7 | 7 |

PHOTOGRAPHIC PRINTING APPARATUS AND EXPOSURE CONDITION DETERMINING METHOD

BACKGROUND OF THE INVENTION

1. Field of the Invention

The present invention relates to an exposure condition determining method and a photographic printing apparatus to which the exposure condition determining method is applied.

2. Description of the Related Art

Light of three colors, B (blue), G (green) and R (red), is transmitted through the entire image surface of an image recorded on a color negative film. It is known that, in general, the ratio of the three colors transmitted through the image is substantially equal or the ratio is fixed. Therefore, the exposure condition is determined in a photographic printing apparatus in accordance with the following formula:

$$\log E_j = K_j + D_j \qquad (1)$$

wherein log E is the logarithm of the amount of exposure E, K is a constant, D is the light accumulated transmission density (LATD) of an image photometrically measured by a photometric system, and j is any of R, G, and. B light. When an image is printed at the photographic printing apparatus at an exposure condition determined on the basis of above Formula (1), the overall density of a print produced from an underexposed image is high compared with the density of a print obtained from an appropriately exposed image, whereas the density of a print produced from an overexposed image is low. Therefore, the value Dj in Formula (1) is corrected by effecting slope control, and the exposure condition is determined. However, characteristics of films, such as sensitivities and densities of the three photosensitive layers, are different for different types of films which are categorized in accordance with the manufacturer and the sensitivity thereof. When different types of films are printed/exposed under the same exposure condition determined as described above, constant and high-quality prints cannot be obtained.

As a result, as a method of correcting for the differences between the types of films and effecting appropriate printing, a method and apparatus have been proposed for prescribing the amount of copy light when a color original is copied (Japanese Patent Application Laid-Open No. 55-46741). In this method of prescribing the amount of light, a plurality of image frames recorded on one roll of a film, which is to be printed, is photometrically measured. A characteristic curve of the difference in color densities related to the average density is prepared, and a film characteristic value expressing the characteristic of the film is determined. Further, the photometric value (the original characteristic value) of an image frame to be printed is corrected by the film characteristic value so that the value Dj in Formula (1) is obtained and the exposure condition is determined.

The photometric value of the image frame recorded on the film is effected by the characteristics and the like of the film. The film characteristic value obtained by the above-described method reflects the film characteristic of an individual film. Accordingly, an exposure condition corrected for differences in the film types is obtained by using the film characteristic value. Further, when the film has deteriorated over time and the colors of the image frames have faded, it is preferable to effect printing at an amount of exposure which is varied from a standard amount of exposure in accordance with the extent of deterioration caused by time. In the aforementioned method of prescribing the amount of light, the photometric value varies in accordance with the variation in the film characteristic due to deterioration over time. The photometric value varies in accordance with the variation in the film characteristic value. Therefore, high-quality prints in which the effects of deterioration due to time have been corrected are obtained. Moreover, good results in correcting the effects of deterioration due to time are also obtained in cases in which most of the image frames recorded on the film have been photographed by heterogeneous light sources other than sunlight.

However, there are cases in which a large number of the image frames recorded on a single roll of film are prone to color failure. In such cases, there is a drawback in the above method of prescribing the amount of light in so far as good results cannot be obtained. Examples of image frames prone to color failure include image frames in which the photographed subject is green, such as trees, flowers and the like, or image frames including a blue summer sky and the sea. Further, image frames photographed on lawns in parks or the like and sport scenes in which subjects are photographed under bright sunlight are also susceptible to color failure. When a large number of these image frames prone to color failure are included successively on a single roll of film, it is difficult to correctly determine the film characteristic value.

Reasons for this difficulty are that in image frames prone to color failure, as the density of a specific color is high and the color balance is deviated from that of an image frame of a general, photographed subject, the film characteristic value of a film on which many images susceptible to color failure are recorded varies due to the effects of the color failure and does not adequately reflect the film characteristic. Correct determination of the film characteristic value is therefore difficult. When the image frames are printed at an exposure condition determined by using the film characteristic value of a film having many images prone to color failure, the main subject is printed at a color balance which deviates from the correct color balance. This effect occurs even when, for example, about half of the number of the image frames of a single roll of film are susceptible to color failure. Therefore, this problem occurs quite frequently.

An apparatus for determining an amount of exposure for photographic printing is proposed in Japanese Patent Application Laid-Open No. 2-93448 as another means for correcting for the differences between film types, and effecting appropriate printing. This apparatus includes a storing means which reads a code of the film type recorded on films, classifies the films per film type based on the code, and stores the image density for each film type. In this apparatus, image densities are calculated by using photometric values belonging to a specific color region based on the stored image densities, so as to determine the amount of exposure. Further, a method of determining amount of exposure for an image copying apparatus has been proposed in Japanese Patent Application Laid-Open No. 2-90140. In this method, a determination of the amount of exposure is made by detecting where photometric data regarding the three colors of the film belong to any of color regions on a color coordinate system, which is divided into a plurality of these color regions, and the photometric data are classified. Then, the amount of exposure is determined based on a first image data belonging to a color region in which the color difference or the color ratio from a reference value is low, and a representative value of the first image data, or the reference value.

The above systems are based on the premise that the films of the same type have similar characteristics, and the color balance and the like of image frames recorded thereon are similar. Over a long period of time, data obtained from a large number of films is stored for each type of film, and the exposure condition is determined based on the data for each type of film and on the data for the image frame to be printed. Accordingly, even in cases in which films which have many images prone to color failure recorded thereon are to be printed, the effect due to the color failure can be almost completely eliminated. However, compared with the above-described method of prescribing the amount of light, even if, for example, the film has deteriorated due to the passage of time, the variation in the film characteristic due to this deterioration is not easily reflected in the exposure condition, and there is a problem in that high-quality printing results cannot be obtained. This problem also occurs when image frames which were photographed under heterogeneous light sources are to be printed.

In recent years, a number of high-sensitivity films has been developed. Currently, there is a very large number (several tens) of types of high-sensitivity films. A film is classified into one of the many types of films based on the manufacturer of the film or the sensitivity thereof. Films of different types differ in their film characteristics, which include the sensitivities of three photosensitive layers, the density of a base layer, and the like. Therefore, the optimal exposure conditions are not always the same.

Further, images of a standard subject, which is photographed at correct exposure, underexposure and overexposure, are recorded on exposure condition setting films which are used when the exposure condition of the image frame recorded on the film is set. However, these exposure condition setting films are only prepared for an extremely limited number of film types. The setting of exposure conditions of film types for which an exposure condition setting film has not been prepared is carried out by trial and error. Therefore, time and experience are necessary to set the exposure condition.

From this point of view, the following technologies have been developed and explained in Japanese Patent Application Laid-Open No. 63-311241 and the previously-discussed Japanese Patent Application Laid-Open No. 2-93448. A reading means for reading a DX code, which is recorded in advance on the film and expresses the film characteristic and the like, is provided. The film type is determined based on the read DX code. The image data is stored in a memory corresponding to the film type. The exposure condition is determined by using the image data corresponding to the film type of the film which is to be printed. Accordingly, the exposure condition is determined based on the stored image data for each type of film and on a reference exposure condition. Therefore, even if an exposure condition setting film, which corresponds to the film type of the film to be printed, is not available, an accurate exposure condition can easily be obtained.

However, currently, new films are being developed every year, and the manufacturing of older films is often stopped. In the above-described technologies, the storage regions for storing the data for determining the exposure conditions are not managed. Therefore, a drawback arises in that the limited storage regions, which are provided with a memory or the like, are occupied by data regarding types of films which are no longer manufactured or data regarding types of films which were developed long ago and are used infrequently.

In order to solve this drawback, a film managing apparatus has been proposed in Japanese Patent Application Laid-Open No. 2-93449. In this apparatus, a determination is made whenever necessary as to whether there are film types, among the film types stored in the memory of the apparatus, having similar film characteristics. When there are similar film types, the respective data thereof are integrated, and one of the data is deleted. In this way, necessary storage regions can be conserved. However, there are drawbacks in that it is not easy to automatically determine with accuracy whether the film characteristics are similar and in that the precision of the data deteriorates.

SUMMARY OF THE INVENTION

In view of the aforementioned, a first object of the present invention is to provide a photographic printing apparatus and an exposure condition determining method in which color failure can be eliminated and in which high-quality prints are consistently obtained regardless of variations in film characteristics due to deterioration over time and the like.

A second object of the present invention is to provide a photographic printing apparatus and an exposure condition determining method in which an appropriate exposure condition can be set per film type and in which management of storage regions needed for storing data is unnecessary and the storage regions can be reduced.

In order to achieve the above-described objects, the photographic printing apparatus of the present invention is comprised of: photometric measuring means for dividing an image frame recorded on a film into a plurality of portions and photometrically measuring the divided portions; selecting means for selecting photometric data necessary for determining an exposure condition, from a plurality of photometric data obtained by photometric measuring by the photometric measuring means; first storing means for storing data obtained by the photometric measuring of a plurality of rolls of film; second storing means for storing data obtained by the photometric measuring of an image frame of a single film upon which an image frame to be printed is recorded; weighting factor setting means for setting weighting factors to be applied respectively to selected data of the image frame to be printed, selected by the selecting means, and to data determined from data stored in the first storing means, and to data determined from data stored in the second storing means; and exposure condition determining means for determining an exposure condition based on a value obtained from respectively weighted data which are weighted by the weighting factors set by the weighting factor setting means.

The aforementioned selected photometric data includes cases in which selected photometric data is converted into other data, as described in Japanese Patent Application Laid-Open No. 61-223731.

The exposure condition determining method of the present invention includes the steps of dividing an image frame to be printed into a plurality of portions and measuring photometrically the portions; selecting photometric data necessary for determining an exposure condition; setting weighting factors to be applied respectively to the selected photometric data, and to data determined from data obtained by photometric measuring of a plurality of rolls of film, and to data determined from data obtained by photometric measuring of image frames of a single film on which image frames to be printed are recorded; and setting an exposure condition based on a value obtained from respective weighted data which are weighted by the weighting factors.

Operation of the present invention will be described hereinafter. The data obtained by photometric measuring is stored in the first storing means for a plurality of films. The data obtained by photometric measuring of the image frames of the single roll of film on which the image frame to be printed is to be recorded is stored in the second storing means. Photometric data, selected data which is selected from the photometric data as data necessary for determining the exposure conditions, results obtained by classifying the photometric data or the selected photometric data per density and calculating the average value of the data per classification, and the like can be used as data obtained by photometric measuring. The weighting factor setting means sets weighting factors to be applied respectively to the following data: selected data which is selected from photometric data of a plurality of image frames to be printed and which is necessary for the determination of the exposure condition, data which is determined from data stored in the first storing means, and data which is determined from data stored in the second storing means.

It is preferable that density data corresponding to densities of the selected data be used as the data determined from data stored in the first storing means and the second storing means. Because, generally, the three color balance of the stored data differs due to the density, it is necessary to use data having a three color balance of a density the same as that of the image frames. Further, because the three color balance differs according to film type, it is necessary to determine the respective three color balances from each of the stored data. The hue, in which, generally, the densities of the three colors are integrated, of data obtained from photometric measuring of the plurality of films is a constant hue of gray or near gray. On the other hand, with regard to the data obtained by photometric measuring of image frames of the single roll of film on which the image to be printed is recorded, the color balance, determined by integrating the three color densities, expresses the overall trend of the color balance of the plurality of image frames recorded on the film, and reflects the film characteristics (three color sensitivity balance, three color gradation balance, three color density balance, and the like) including variations due to deterioration caused by the passage of time.

Accordingly, the weighting factors are set respectively for the selected data, the data from the first storing means and the data from the second storing means such that the weighting of the data from, for example, the first storing means becomes large. In this case, the sum of the respective weighted data corresponds to corrected results so that the selected data is near photometric data obtained by photometrically measuring image frames having a gray hue. Accordingly, an exposure condition in which the effects of color failure are eliminated is obtained, from the photometric data of image frames which are prone to color failure, based on the sum of the respective weighted data.

When the weighting factors are set such that the weighting of the photometric data of the second storing means becomes large, the sum of the weighted data corresponds to the results of correcting the selected data so that the overall trend of the color balance of the image frames recorded on the film and the variation in the film characteristics are reflected. Accordingly, when the film characteristics vary due to, for example, deterioration over time, an exposure condition which is corrected in accordance with the degree of variation in the film characteristics is obtained. Further, when, for example, only the image frame to be printed is an image frame which was photographed by using a heterogeneous light source, if the weighting factor is set so that the weight of the selected data becomes large, the image frame to be printed is not effected by the difference in the color balance caused by the difference in the light sources of that image frame and the other image frames, so that the appropriate exposure condition is obtained.

In this way, when each of the weighting factors for the respective data are set appropriately, the effects of color failure can be eliminated, and high quality prints can always be obtained regardless of variations in the film characteristics due to deterioration over time or the like.

It is preferable that the selecting means selects data which is necessary to the determination of the exposure condition based on the data stored in the first storing means. As described previously, the hue, which is obtained by integrating the three color densities, of the data obtained by photometric measuring of image frames of a plurality of rolls of film is a constant hue of gray or near gray. Therefore, when the photometric data is selected with the data stored in the first storing means as a reference, the effect of the color of the photographed subject on the selected data can be lessened. If the selected data which is selected in this manner is stored in the first storing means and the second storing means, the appropriate exposure condition can be obtained based on the data.

Further, when the amount of data stored in the second storing means is small, the data stored in the second storing means does not sufficiently express the overall color balance of the image frames recorded on the film, and the precision is low. In such a case, an appropriate exposure condition cannot be obtained by increasing the weight applied to the data from the second storing means. As a result, it is preferable that the weighting factor setting means sets the weighting factors such that the weight of the data obtained from the data stored in the second storing means becomes greater in accordance with the increase in the amount of data stored in the second storing means. In this way, the appropriate exposure condition can be obtained regardless of the amount of data stored in the second storing means.

Further, when the color balance of the selected data is biased, it is preferable to change the weighting factors applied to each data. For example, when the image to be printed is an image which is susceptible to color failure, the color balance of the selected data is biased toward a specific color. The data of the second storing means is also effected by this process. However, if the weighting factors of the data are changed so that the weighting of the data from the first storing means is large, an exposure condition in which the color failure is eliminated can be obtained. As another example, if the film characteristics of the film upon which the image frame to be printed is recorded have changed due to deterioration over time or the like, the respective color balances of the selected data and the data of the second storing means are biased. However, if the weighting factors are changed such that the weighting of the data from the second storing means is made large, the appropriate exposure condition can be obtained regardless of the variation in the film characteristics as described above.

In the present invention structured as described above, respective weighting factors are set for the following three types of data: selected data which is photometric data selected from among the photometric data of a plurality of image frames to be printed and which is necessary for determining the exposure condition, data which is stored in the first storing means and which is determined from data obtained by photometric measuring of a plurality of films, and data which is stored in the second storing means and which is determined from data which is obtained by photometric measuring of the image frames of a single roll of film on which the image frame to be printed is recorded. The exposure condition is set based on the value which is obtained by summing the respective weighted data. Therefore, superior effects can be achieved in that color failure can be eliminated and high quality prints can always be obtained regardless of variations in the film characteristics due to deterioration over time.

In the present invention, when data obtained by photometry is stored for each film type in the first storing means based on a film type identifying code or the like, it is preferable to further provide a stored data managing means. The stored data managing means corresponds a date when the data was stored or dates when the data was used with a film type, and stores the date when the data was stored or dates when the data was used, as well as deletes data of a predetermined film type based on the date when the data was stored or the dates when the data was used.

The data may be deleted when a predetermined period of time or more has passed since the data was last used, or when the amount of stored data exceeds a predetermined amount, or when data of a new film type is stored, or the like. In this way, for example, data of film types which are no longer manufactured and which have not been used for a long time and data of film types which are used infrequently are deleted so that the increase in the amount of data can be controlled. Therefore, the size of the storage regions needed to store the data for each film type can be decreased.

As described above, the deletion of data of a film type can be effected in accordance with a specific timing based on the date when the data was stored or the dates when the data was used. In this way, an appropriate exposure condition can be set for each film type, and the storage regions needed for storing data can be reduced without necessitating management of the storage regions.

BRIEF DESCRIPTION OF THE DRAWINGS

FIG. 9 is a schematic structural view of a photographic printing apparatus in accordance with a second embodiment.

FIG. 21 is a diagrammatic view illustrating color regions.

DESCRIPTION OF THE PREFERRED EMBODIMENTS

First Embodiment

Figure 1:
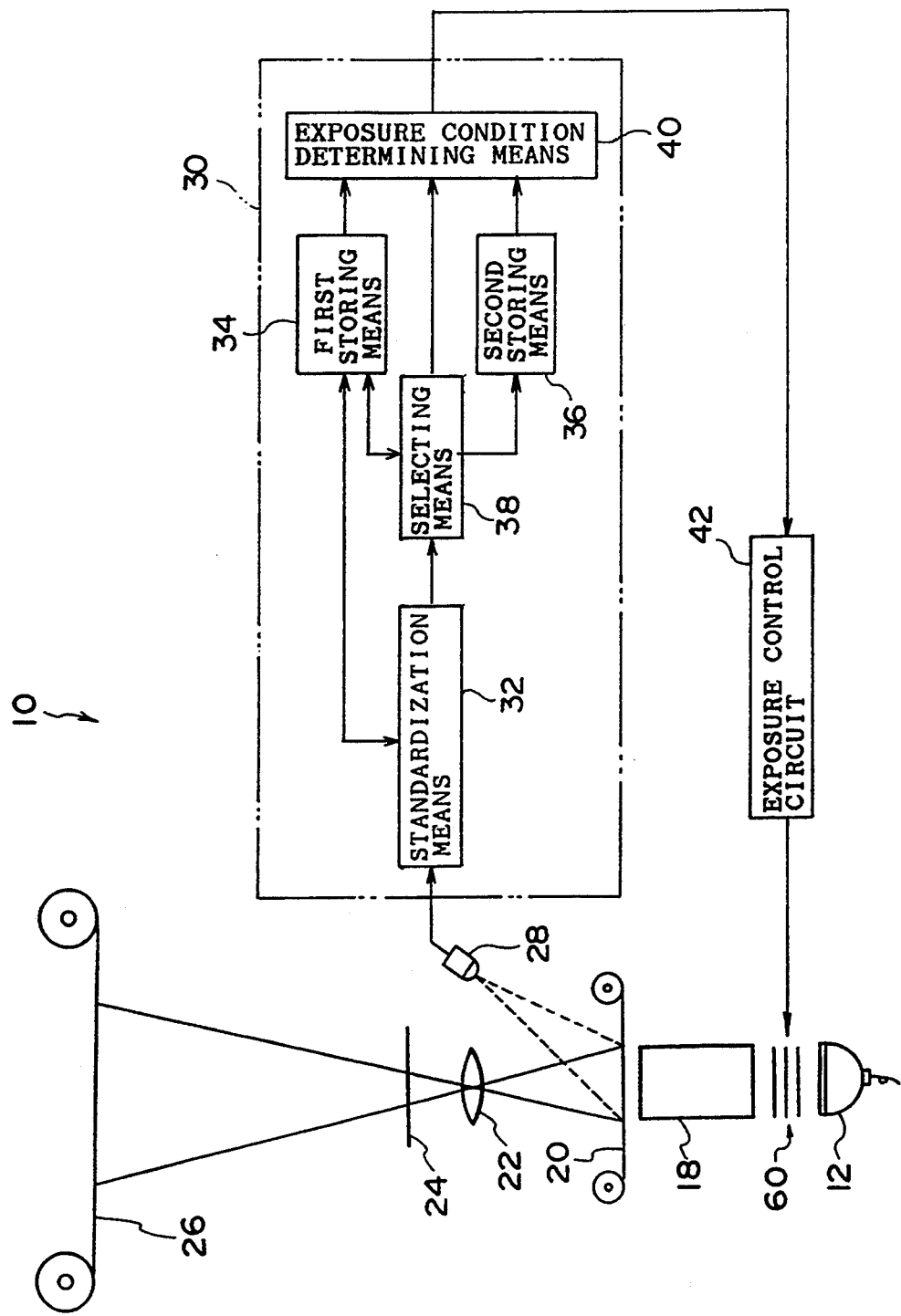
FIG. 1 is a schematic structural view of a photographic printing apparatus in accordance with a first embodiment.

A first embodiment of the present invention will be described in detail hereinafter with reference to the drawings. FIG. 1 is a schematic structural view of a photographic printing apparatus 10 of the first embodiment of the present invention. A color negative film 20, which is set at a negative carrier which is not shown, is conveyed to a printing position by the negative carrier. A mirror box 18 and a lamp house 12, which is equipped with a halogen lamp, are arrayed beneath the printing position. A light-adjusting filter section 60 is disposed between the mirror box 18 and the lamp house 12. The light-adjusting filter section 60 includes three CC filters of a Y (yellow) filter, an M (magenta) filter, and a C (cyan) filter.

Figure 2:
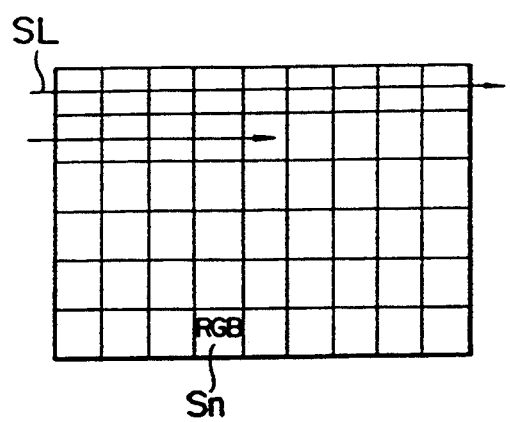
FIG. 2 is a conceptual view illustrating a process of photometrically measuring divided surfaces.

A lens 22, a black shutter 24 and a color paper 26 are disposed in that order above the printing position. Light which is emitted from the lamp house 12 is transmitted through each filter of the light-adjusting filter section 60, the mirror box 18 and the negative film 20 so that an image is formed on the color paper 26 by the lens 22. Further, a photometer 28 is disposed in a direction, which is inclined with respect to the optical axis of an image-forming optical system, which is comprised of the above-mentioned elements, and at a position at which photometric measuring of the image densities recorded on the negative film 20 is carried out. The photometer 28 is formed by a two-dimensional image sensor or a line sensor or the like. As illustrated in FIG. 2, a surface of an image frame recorded on the negative film 20 is divided into a large number of pixels Sn, and the image frame is photometrically measured along scanning lines SL. In this case, photometric measuring of each pixel is effected for each of the three primary colors, R, G, and B.

The photometer 28 is connected to an arithmetic and logical unit 30 formed by a microcomputer and its peripheral devices. As can be seen in FIG. 1, the arithmetic and logical unit 30 which carries out processes is comprised of three main function blocks: a standardization means 32, a selecting means 38 and an exposure condition determining means 40. The arithmetic and logical unit 30 also includes a first storing means 34 and a second storing means 36 which store data. The first storing means 34 is formed by a rewritable, nonvolatile memory, e.g., an EEPROM (electrically erasable programmable ROM) and a RAM connected to a back up power source, so that even if the power supply is cut, the stored photometric data can be maintained. The second storing means 36 may be formed by a volatile memory (e.g., a regular RAM) or the like.

Photometric data obtained by the photometer 28 is input to the standardization means 32, and is standardized therein, as will be explained later. In the selecting means 38, only the photometric data which is necessary to the determination of the exposure condition is selected from the standardized photometric data, and is output to the first storing means 34, the second storing means 36 and the exposure condition determining means 40. The exposure condition determining means 40 sets weighting factors to be applied to the respective data which are input from the selecting means 38, the first storing means 34 and the second storing means 36. The exposure condition determining means 40 determines the exposure condition on the basis of the sum of the respective weighted data which is calculated by using the weighting factors, The exposure condition determining means 40 is connected to an exposure control circuit 42. The exposure control circuit 42 controls the printing exposure condition for printing onto the color paper 26 by controlling the light-adjusting filter portion 60 based on the exposure condition determined by the exposure condition determining means 40.

Figure 8:
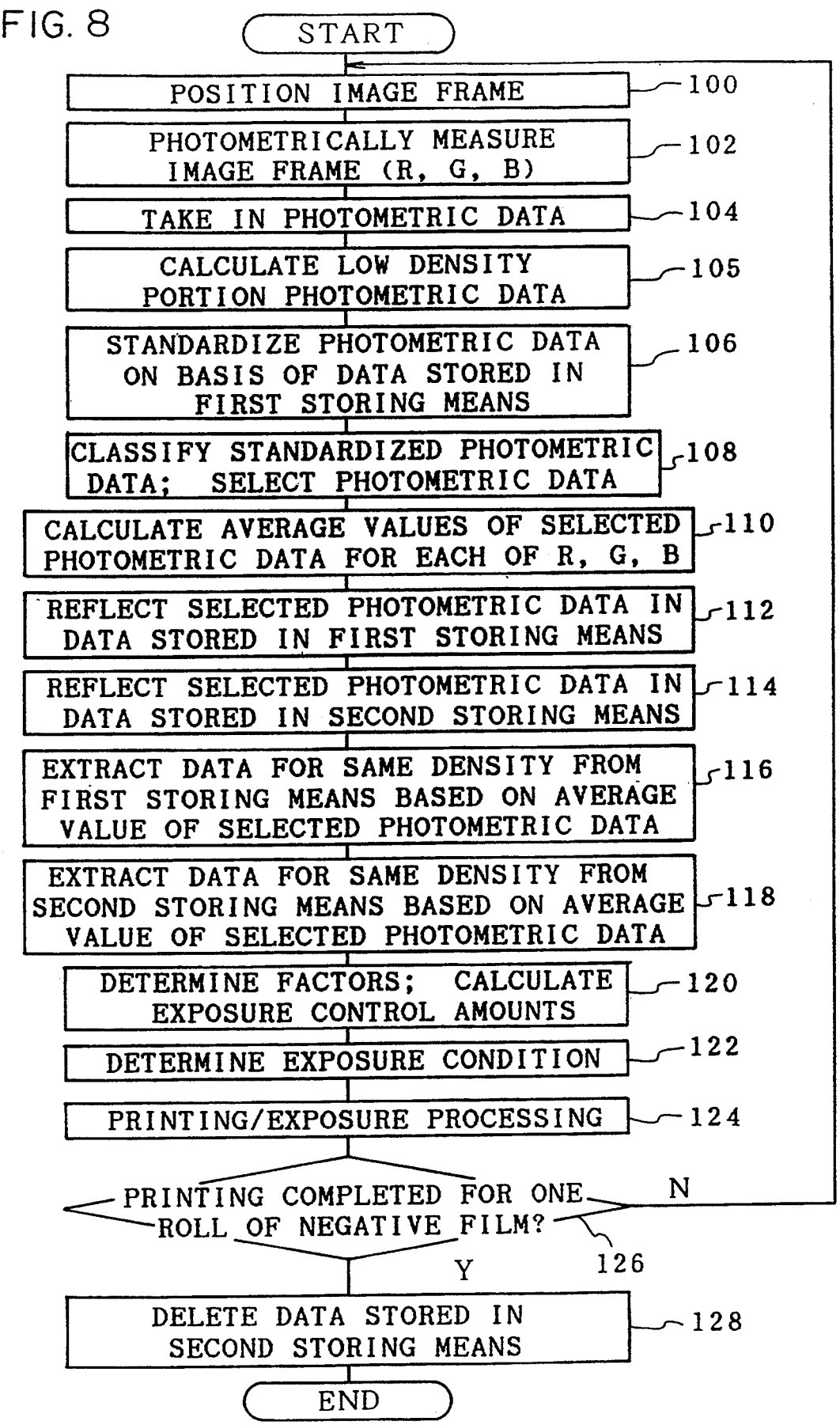
FIG. 8 is a flowchart explaining an operation of the first embodiment.

Next, operation of the first embodiment will be described with reference to the flowchart in FIG. 8. The flowchart in FIG. 8 is implemented for each roll of negative film 20 which is set at the photographic printing apparatus 10 and for which printing is to be effected.

In step 100, the leading image frame of the negative film 20 is positioned at the printing position. In step 102, the positioned image frame is divided into a large number of regions and each of the regions is photometrically measured by the photometer 28. In step 104, a large number of photometric data regarding the three colors, which was obtained by photometry, is taken in.

In subsequent step 105, low density portion photometric data, MIN (R), MIN (G), MIN (B), for the three colors are calculated, as will be described later, by using the photometric data regarding the three colors of the negative film 20 which are taken in in step 104 and are stored in advance in the first storing means 34 of the arithmetic and logical unit 30. The low density portion photometric data, MIN (R), MIN (G), MIN (B), are stored in the first storing means 34. The low density portion photometric data are determined by averaging the lowest densities of each type of film.

A value larger than the average mask density by a predetermined value a (e.g., a value of 0 to 0.6) is compared to the lowest density value of the photometric data on the three colors or the average value of the photometric data on the three colors. When (the average mask density + $a$) > (the lowest density value of the photometric data on the three colors or the average value of the photometric data on the three colors), the lowest density value of the photometric data on the three colors or the average value of the photometric data on the three colors is used as the low density portion photometric data. On the other hand, when (the average mask density + $a$) < (the lowest density value of the photometric data on the three colors or the average value of the photometric data on the three colors), the value larger than the average mask density by the predetermined value a is used as the low density portion photometric data. Because the low density portion photometric data is determined in the above manner, there are cases in which the low density portion photometric data is the lowest density data of the image recorded portions of the negative film 20, and there are cases in which the low density portion photometric data is the lowest density data (mask density) of the non-image portions of the color film.

Figure 3:
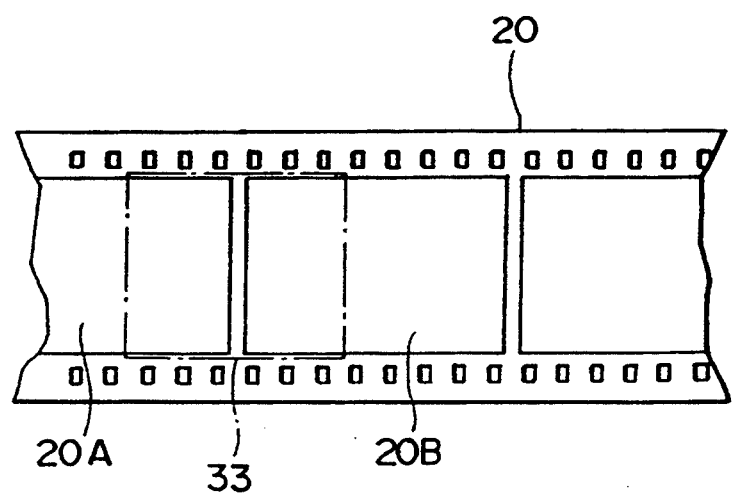
FIG. 3 is a plan view of a negative film used to explain an example of a photometric range when a mask density is measured.

As illustrated in FIG. 3, the lowest density value of the photometric data on three colors may be used as the low density portion photometric data when a photometric area 33 of the photometer 28 extends over image frames 20A and 20B. Further, the non-image portions of the negative film 20 may be photometrically measured in advance before step 100 is implemented, and the low density portion photometric data can be calculated by using the results of this photometry. Alternatively, the low density portion photometric data can be determined by using a functional formula which predicts the mask density or the mask color on the basis of the image photometric data. Because the mask density is compared by the color difference or the color ratio as described above, it is preferable that the mask density is determined and used as the color difference or the color ratio.

In step 106, the standardization of the photometric data is effected based on the data stored in the first storing means 34, as will be described hereinafter. First, photometric data R, G and B for correcting the three colors is calculated by subtracting the low density portion photometric data MIN (R), MIN (G), MIN (B)

from each of the many photometric data regarding the three colors. Next, the correction photometric data R, B are standardized (normalized) by being converted to the density of G by using the standardization table shown in FIG. 4. Standardized photometric data for each of R, G and B are calculated. The negative films differ in film density and gradation balance due to the type of film and developing processing. Even if the same subject is photographed, the image density and the color differ due to the type of film and developing processing. However, these differences are corrected by the above-described standardization. The photometric data is converted so that the respective densities and colors of identical subjects are constant regardless of the type of film and developing processing.

The standardization table is prepared based on the data stored in the first storing means 34. In the first storing means 34, selected photometric data, which is obtained by processing in step 108 (which will be described later) from photometric data of image frames which have been printed up to the present from many rolls of negative film 20, are classified by density. The results of calculating respective average values for R, G and B of photometric data for each classified group are stored in the first storing means 34 (an example is illustrated in Table 1).

TABLE 1

| G Density Range | G Density | R Density | B Density |
| --- | --- | --- | --- |
| 0.0~0.7 | $G_1$ | $R_1$ | $B_1$ |
| 0.7~1.5 | $G_2$ | $R_2$ | $B_2$ |
| 1.5~ | $G_3$ | $R_3$ | $B_3$ |

Figure 4:
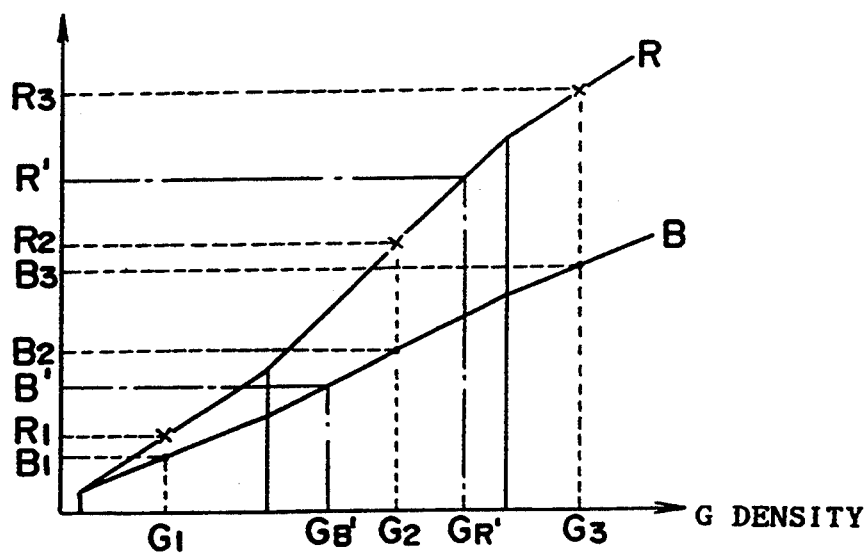
FIG. 4 is a diagrammatic view illustrating a standardization curve.

In the above table, the photometric data is classified and the average values are calculated with the G density as the reference. However, the average values may be calculated with the R density, or the B density, or the average value of the R density, the G density and the B density as a reference. The average values of the above photometric data are average values of photometric values of many frames. Therefore, the hue, when the values which standardize the respective average values of the G density, the R density, and the B density groups are calculated, is a constant hue of gray or near gray. As illustrated in FIG. 4, the above average values are plotted as an example on a plane coordinate wherein the G density is represented on the axis of abscissa and the R density and the B density are represented on the axis of ordinate. The above standardization table is prepared by connecting the plotted points, and is formed by a curve, which illustrates the relation between the average value of photometric data G and the average value of photometric data R, and a curve, which illustrates the relation between the average value of photometric data G and the average value of photometric data B.

In the above description, the photometric data of all of the image frames is standardized by using the standardization table prepared from data stored in the first storing means 34. However, photometric data of image frames from the second frame and the frames thereafter of the negative film 20 or from a frame which is a few frames from the first frame and the frames thereafter may be standardized by using a standardization table prepared from data stored in the second storing means 36.

FIG. 4 illustrates an example of the above-described standardization wherein the average value R' of the R correction photometric data is converted to $G_R$ and the average value B' of the B correction photometric data is converted to $G_B$. Here, the G correction photometric data is not converted and is used as it is. Standardization methods described in Japanese Patent Application Laid-Open No. 56-1039 and Japanese Patent Application Laid-Open No. 62-144158 can be used for the method of the abovementioned standardization. By standardizing the correction photometric data, the same color coordinate system can be used even if the types of film and the like are different.

Figure 5:
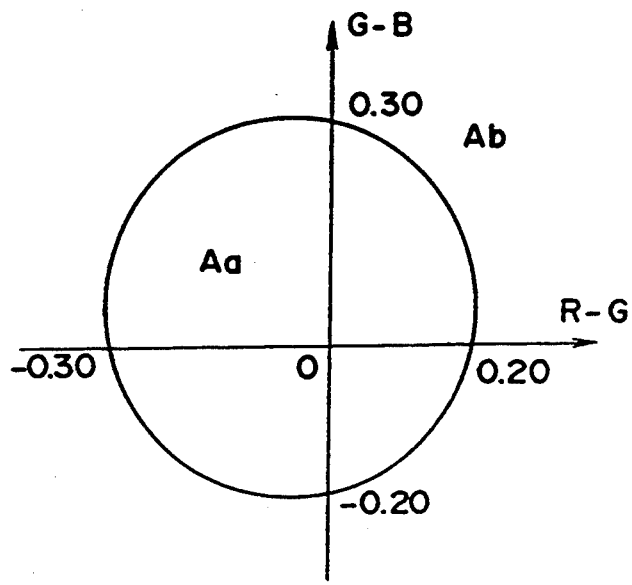
FIG. 5 is a diagrammatic view illustrating a color coordinate system for classifying standardization data for three colors.

In subsequent step 108, it is determined whether the standardization data for the three colors belongs to either of color regions $A_a$, $A_b$ illustrated in FIG. 5. In the coordinate system shown in FIG. 5, the difference R-G of the standardization data R, G is represented on the axis of abscissa, and the difference G-B of the standardization data G, B is represented on the axis of ordinate. The color region $A_a$ is defined on this coordinate system and includes the origin. $A_b$ includes all regions other than $A_a$. The standardization data for the three colors is categorized by the aforementioned determination, and the photometric data is selected as described above. By classifying the standardization data for the three colors as falling into either color region $A_a$ or color region $A_b$, the standardization data for the three colors is classified into data belonging to a region in which the difference in color from a reference value (the origin) is small, and into data belonging to a region in which the difference in color from the reference value is large. In step 108, photometric data belonging to color region $A_a$, in which the color difference of the standardization data from the reference value is small, is selected as photometric data to be used in subsequent processes.

Table 2 shows an example of color regions, standardization data for three colors, which is classified for each color region, and photometric data for three colors, which corresponds to the standardization data for three colors.

TABLE 2

| Color Region | Photometric No. | Photometric Data for Three Colors | | | Standardization Data for Three Colors | | |
| --- | --- | --- | --- | --- | --- | --- | --- |
| | | R | G | B | R | G | B |
| $A_a$ | 1 | 0.72 | 1.03 | 1.17 | 0.60 | 0.63 | 0.57 |
| $A_a$ | 2 | 0.69 | 1.05 | 1.19 | 0.57 | 0.65 | 0.59 |
| $A_b$ | 3 | 0.62 | 1.15 | 1.21 | 0.50 | 0.75 | 0.61 |
| $A_b$ | 4 | 0.60 | 1.18 | 1.20 | 0.48 | 0.78 | 0.60 |
| . | . | . | . | . | . | . | . |
| . | . | . | . | . | . | . | . |
| . | . | . | . | . | . | . | . |

In the above description, the standardization data for three colors is classified by using a color coordinate system with G-B and R-G as the axes. However, a coordinate system may be used in which each axis is one color or a combination of two of more colors of the three primary colors (e.g., $D_x-D_y$, $D_x/D_y$, $D_x/(D_x+D_y+D_z)$, $D_x+D_y+D_z$, $D_x-K$, $D_x/K$, and the like, wherein x, y, z respectively represent differing colors among R, G and B, and wherein K is a constant). Namely, a coordinate system, in which color differences or color ratios other than those described above are used as the coordinate axes, can be used in a two-dimensional or a three-dimensional color coordinate system.

Figure 6:
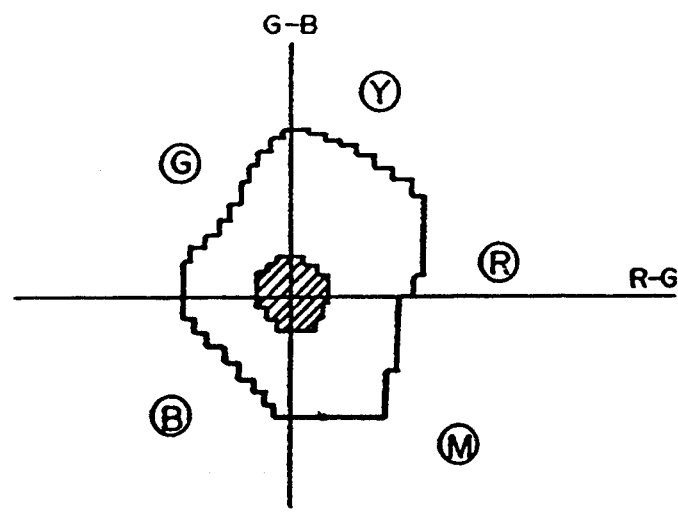
FIG. 6 is a diagrammatic view illustrating another color coordinate system for classifying standardization data for the three colors.

A plurality of color regions can be defined in accordance with the distance from the reference value. The origin of the color axis, a value related to a specific color of the original image, a value determined from average values of a plurality of image frames, the minimum value of the photometric data, a value determined from photometric data of a particular image frame, a constant value determined in advance, or the like can be used as the reference value. Further, the reference value may be a value obtained from a functional expression or a table. In this case, the reference value may be, for example, a value from a table or a functional expression in which the reference value is varied by the density of an image. A neutral color or flesh color, or a color determined from the average value of a plurality of image frames can be used as the above-mentioned specific color. Further, as illustrated in FIG. 6, as the color regions, regions which are provided on a coordinate system whose origin is a neutral color and which are distanced irregularly from the origin may be used.

In step 110, average values $D1_R$, $D1_G$, $D1_B$ of the selected photometric data for R, G and B, respectively, are determined. In step 112, the selected photometric data belonging to color region $A_a$, in which the color difference from the reference value is small, is reflected in data stored in the first storing means 34. More specifically, first, the selected photometric data is classified into a plurality of groups based on density. As described above, the average values of the photometric data per density are stored in the first storing means 34. For each classified group, the average value of, on the one hand, the photometric data of the group and, on the other hand, the average value of the corresponding density of the first storage means 34, is calculated.

This average value $D_O$ is calculated in accordance with following Formula (2) wherein, selected photometric data belonging to, for example, a certain group are $D_{X1}$, $D_{X2}$, ... $D_{Xn1}$, the number of selected photometric data of the group is $n_1$, and $D_y$ is the average value of $n_2$ items of photometric data corresponding to the group.

$$D_0 = \frac{D_{X1} + D_{X2} + \ldots + D_{Xn1} + n_2 \cdot D_Y}{n_1 + n_2} \quad (2)$$

The calculated average values are stored in the first storing means 34.

In step 114, the selected photometric data is reflected, in the same way as in step 112, in the data stored in the second storing means 36. As described above, the selected photometric data is photometric data which has been standardized based on the data in the first storing means 34 and which has been selected. Therefore, the effect of the color of the photographed subject is small, and the film characteristics (the sensitivity balance of the three colors, the gradation balance of the three colors, the density balance of the three colors, and the like) are accurately reflected the data stored in the second storing means 36. Accordingly, even if a large number of the image frames of the negative film 20 are prone to color failure, data, in which the effects of color failure are restrained to a low level, is obtained.

Further, when data is not stored in the second storing means 36, the selected photometric data is classified into a plurality of groups based on density, and the respective average values of the classified groups are stored in the second storing means 36. As the process of photometry and printing for each image frame is carried out successively from the leading image frame of the negative film 20, as will be described later, the selected photometric data of each of the image frames is reflected in the data stored in the second storing means 36. Therefore, as the process continues, the color balance of the data which standardizes the average values approaches the overall trend of the color balance of the image frames recorded on the negative film 20.

Figure 7:
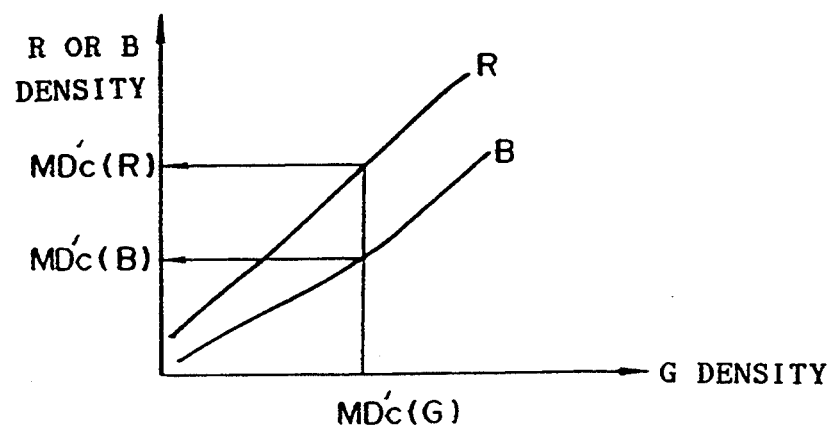
FIG. 7 is a diagrammatic view illustrating a process of determining image data by using standardization curves.

In step 116, image data $MD2_j$, for each of R, G and B for the same density in the first storing means 34, are determined based on the average values of the selected photometric data. The image data $MD2_j$ are calculated in the following manner: the average value $MD1_G$ of the G density of the photometric data determined in step 110 is set to $MD'(G)$. $MD'(G)$ is inversed by interpolation or extrapolation using the standardization table prepared from the average values of the photometric values stored in the first storing means 34. The R density $MD'(R)$, and the B density $MD'(B)$ are determined (cf. FIG. 7). As shown in Formula (3), the image data $MD2_j$ are determined by adding the low density portion photometric data MIN(R), MIN(G), MIN(B) to the R, G and B densities $MD'(R)$, $MD'(G)$, $MD'(B)$, respectively.

$$\left. \begin{array}{l} MD2_R = MD'(R) + \text{MIN}(R) \\ MD2_G = MD'(G) + \text{MIN}(G) \\ MD2_B = MD'(B) + \text{MIN}(B) \end{array} \right\} \quad (3)$$

In subsequent step 118, in the same way as in step 116, image data $MD3_j$, for each of R, G and B for the same density in the second storing means 36, are determined based on the average values of the selected photometric data. The image data $MD3_j$ are calculated in the following manner: the average value $MD1_G$ of the G density of the photometric data is set to $MD''(G)$. $MD''(G)$ is inversed in the same manner as described above by interpolation or extrapolation using the standardization table prepared from the average values of the photometric values stored in the second storing means 36. The R density $MD''(R)$ and the B density $MD''(B)$ are determined. As shown in Formula (4), the image data $MD3_j$ are determined by adding the low density portion photometric data MIN(R), MIN(G), MIN(B) to the R, G and B densities $MD''(R)$, $MD''(G)$, $MD''(B)$, respectively.

$$\left. \begin{array}{l} MD3_R = MD''(R) + \text{MIN}(R) \\ MD3_G = MD''(G) + \text{MIN}(G) \\ MD3_B = MD''(B) + \text{MIN}(B) \end{array} \right\} \quad (4)$$

In the above description, the density of the selected photometric data is represented by the G density. Image data of the same density as the average value $MD1_G$ of the G density is determined from the data stored in the first storing means 34 and the second storing means 36. However, the selected photometric data may be represented by the R density or the B density, or image data for the same density as the average density of the three colors of the selected photometric data may be determined.

In step 120, weighting factors K1, K2, K3 for weighting the average value $MD1_j$ of the selected photometric data, the image data $MD2_j$ from the first storing means 34, and image data $MD3_j$ from the second storing means 36, respectively, are determined, and an exposure control amount $D_{ij}$ is calculated. In the present embodiment, the exposure control amount $D_{ij}$ is calculated by using following Formula (5).

$$D_{ij} = K1,MD1_j + K2,MD2_j + K3,MD3_j \quad (5)$$

wherein:
j represents any one of R, G and B
i represents an individual film

Constant values are set as initial values of the weighting factors K1, K2, K3, which vary in accordance with each type of condition so as to satisfy the relations shown in Formula (6).

$$\left.\begin{array}{l} K1 = 10 - (K2 + K3) \\ 2 \leq (K2 + K3) < 9 \\ 1 \leq K2 < 7 \\ 1 \leq K3 < 7 \end{array}\right\} \quad (6)$$

The following are examples of the conditions mentioned above.

1. Amount of Data Stored in the Second Storing Means 36

When the amount of data stored in the second storing means 36 is small, it can be assumed that the accuracy of the image data $MD3_j$ is low and that the color balance of the image frames recorded on the negative film 20 is not expressed. Therefore, for example:
amount of data < data for 2 frames: K3=1
data for 2 frames ≦ amount of data < data for 3 frames: K3=2
data for 3 frames ≦ amount of data: K3=3

2. Density of Image Frame to be Printed

When the density of an image frame to be printed is either extremely high or extremely low, it can be thought that there is much variation in the characteristics of the negative films and that the precision of the photometric data, in particular, the precision of the image data $MD3_j$, is low. Therefore, for example:
average density of entire image surface of image frame < 1.5: K3=3
1.5 ≦ average density of entire image surface < 1.8: K3=2
1.8 ≦ average density of entire image surface: K3=1

3. Color Failure of Image Frame to be Printed

When color failure has occurred in the image frame to be printed and the color balance is biased toward a specific color, the color balance of the image data $MD1_j$, which was obtained by the photometric data being classified and selected, is also biased toward the specific color. The image data $MD3_j$ also is slightly effected by the color failure (if other image frames are also image frames prone to color failure, the effect is large). As a result, in the above case, in order for the main photographed subject to be printed at the appropriate color, for example, the value of the weighting factor K1 is made small, and:
the difference between the hue of the entire image surface of the image frame to be printed and the hue of entire image surfaces of a plurality of frames < 0.2: K2=1
0.2 ≦ the difference in hue: K2=3

If, for example, the color balance is biased to a specific color compared with the image data from the first storing means 34 and a region of the image frame having a surface area greater than or equal to a predetermined area is a constant hue, it can be determined that the image frame is prone to color failure.

4. Deterioration of the Negative Film over Time

When the film characteristics vary due to deterioration of the negative film over time and image frames, including the image frame to be printed, have faded, the color balance of the photometric data is biased to a specific color compared with the image data from the first storing means 34, and it is necessary to compensate the exposure condition in accordance with the degree of the deterioration due to time. In such a case, the value of the weighting factor K3 is made large so that the weight of the image data $MD3_j$, in which the effects of the film characteristics are averaged and reflected, is made large. When, for example, the color balance of all of the image frames of a negative film has become a particular color balance due to deterioration over time, it can be determined that the degree of deterioration over time is large.

5. Light Source during Photographing

When the image frame to be printed was photographed under a heterogeneous light source such as fluorescent light or tungsten light, the color balance of the photometric data is biased toward a specific color compared with the image data from the first storing means 34, and it is necessary to compensate the exposure condition. In such a case, when only the image frame which is to be printed was photographed under a heterogeneous light source, the value of the weighting factor K1 is made large. When almost all of the image frames of the negative film were photographed under a heterogeneous light source, the value of the weighting factor K2 is made large. The determination as to whether an image frame was photographed under a heterogeneous light source can be made by, for example, determining whether the color balance of the photometric data is a color balance which is characteristic of a heterogeneous light source.

The values of the weighting factors K1, K2, K3 are also varied in accordance with, for example, the amount of data stored in the first storing means 34, the color distribution of the photographed subject which is predicted from the photometric data, the features of the photographed scene, and the like. It has been determined empirically that it is preferable to vary the value of the weighting factor K1 within a range of 3 to 6 in accordance with the various conditions. In the above description, the total of the weighting factors K1, K2, K3 is set to 10 (cf. Formula 6). However, because these values are used for weighting, it suffices that the total thereof is set to a constant value.

The determined weighting factors are substituted into above Formula 5, and the exposure control amount $D_{ij}$ is calculated. In the above description, the exposure control amount $D_{ij}$, which is the sum of the respective weighted data, is calculated in accordance with Formula 5 by using the weights described above. However, the present embodiment is not limited to the same; weight average values may be calculated as the weights of the respective data.

In step 122, the exposure condition is determined based on the exposure control amounts determined in step 120. The exposure condition is determined in accordance with Formula 7 below.

$$\log E_j = S_j A_j (D_{ij} - D_{\phi j}) + K_j \quad (7)$$

wherein
- j: any one of R, G and B
- log E: logarithm of the amount of exposure
- $D_{ij}$: exposure control amount
- $D_{\phi j}$: density of reference negative film
- $K_j$: constant determined by the color paper and the photographic printing apparatus
- $S_j$: slope control coefficient (=0.5 to 2.0)
- $A_j$: color correction coefficient (=1.0)

In step 124, the exposure condition, which results from the respective exposure amounts of R, G and B which were determined above, is set by the exposure control circuit 42. The image frame positioned at the printing position is printed/exposed onto the color paper 26 at the exposure condition in the exposure control circuit 42. In subsequent step 126, a determination is made as to whether printing has been completed for all of the image frames of the negative film 20 set at the photographic printing apparatus 10. If the determination in step 126 is "No", the process returns to step 100. The next image frame is positioned at the printing position and is photometrically measured. The exposure condition is determined therefor, and the image frame is printed.

By repeating the processes in steps 100 through 126, the amount of data stored in the second storing means 36 gradually increases. In this way, the overall color balance of the image frames recorded on the negative film 20 is reflected in the image data MD3$_j$ from the second storing means 36, and the precision improves. As a result, the value of the weighting factor K3 can be made large.

When the answer to the determination in step 126 is "Yes", the process moves on to step 128 in which the photometric data and the average values stored in the second storing means 36 are deleted, and processing is completed.

Second Embodiment

Next, a second embodiment of the present invention will be described. Parts of the second embodiment which are the same as those of the first embodiment are denoted with the same reference numerals, and explanation thereof is omitted.

As illustrated in FIG. 9, a photographic printing apparatus 70 of the second embodiment is equipped with a bar code reading device 72. The bar code reading device 72 reads a DX code recorded on the negative film 20 itself or on a cartridge 76 in which the negative film 20 is accommodated. The DX code displays, by bar code, information expressing the type of film, such as the name of the film manufacturer, the film sensitivity, the film family, and the like. The bar code reading device 72 is connected to a film type classification means 74 of the arithmetic and logical unit 30.

The film type classification means 74 is equipped with a memory which stores correspondences between DX codes and film types. The film sensitivity, the film family, the name of the manufacturer and the like are determined on the basis of the DX code read by the bar code reading device 72. The film type classification means 74 classifies the films as negative films having several film characteristics in common, such as manufacturer, sensitivity, gradation, base density, configuration of the characteristic curve, and the like, or the film classification means 74 classifies the films as being of the same film type. Accordingly, the films which are to be printed can be classified mainly per the same film types or similar film types of the printing exposure condition.

The film type classification means 74 is connected to the first storing means 34. As shown in following Table 3, the first storing means 34 classifies the photometric data from a large number of negative films into categories of photometric data photometrically measured from negative films of the same film type. The categories of photometric data are further classified into groups by density. The results of calculating the average value of each group are stored in the first storing means 34. Accordingly, a standardization table is prepared for each film type from the data stored in the first storing means 34.

TABLE 3

| Film Type | G Density Range | G Density | R Density | B Density |
|---|---|---|---|---|
| A | 0.0~0.7 | $G_{A1}$ | $R_{A1}$ | $B_{A1}$ |
|   | 0.7~1.5 | $G_{A2}$ | $R_{A2}$ | $B_{A2}$ |
|   | 1.5~ | $G_{A3}$ | $R_{A3}$ | $B_{A3}$ |
| B | 0.0~0.7 | $G_{B1}$ | $R_{B1}$ | $B_{B1}$ |
|   | 0.7~1.5 | $G_{B2}$ | $R_{B2}$ | $B_{B2}$ |
|   | 1.5~ | $G_{B3}$ | $R_{B3}$ | $B_{B3}$ |
| . | . | . | . | . |
| . | . | . | . | . |

Figure 10A:
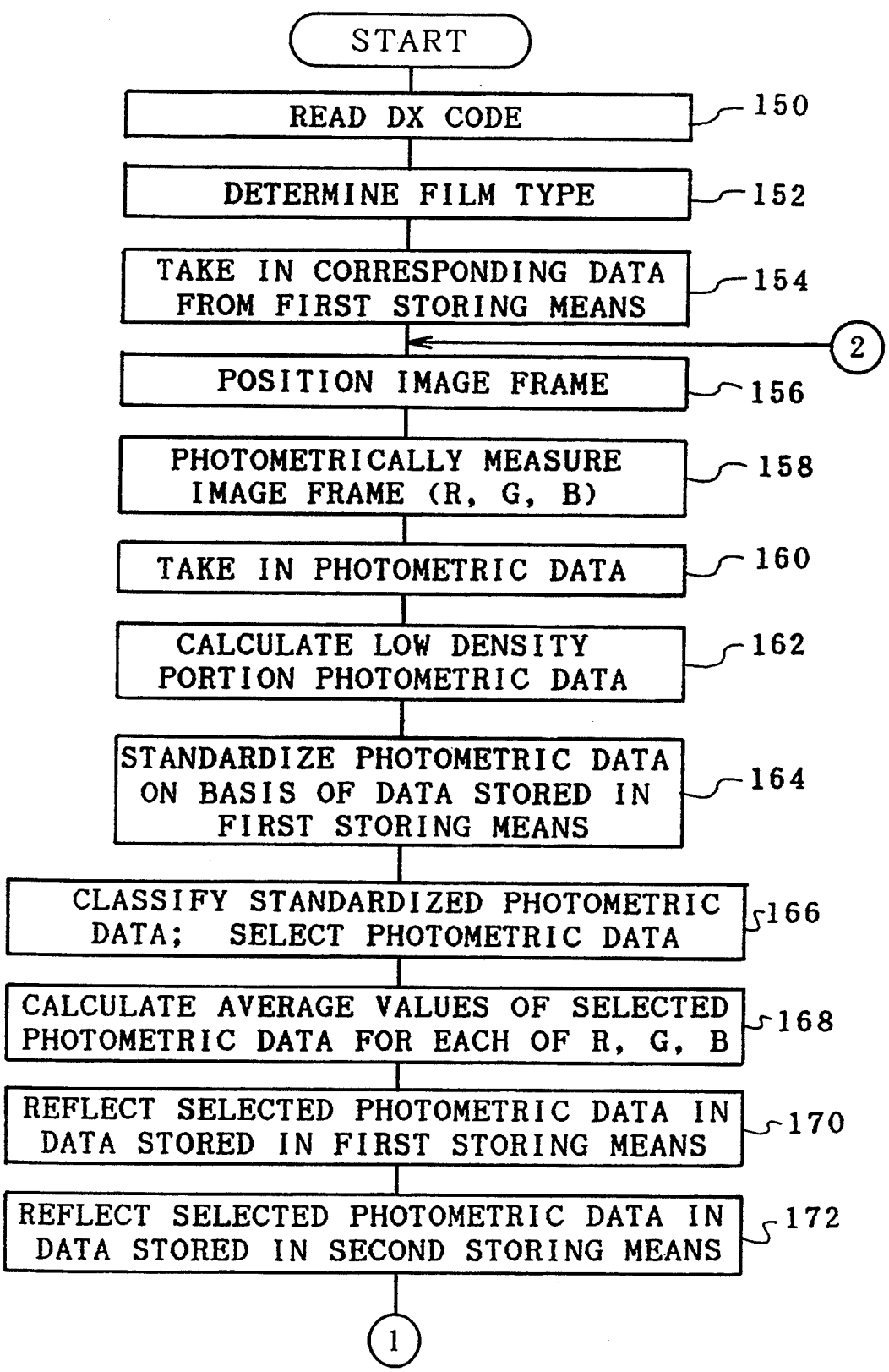
FIGS. 10A, 10B are flowcharts explaining an operation of the second embodiment.
Figure 10B:
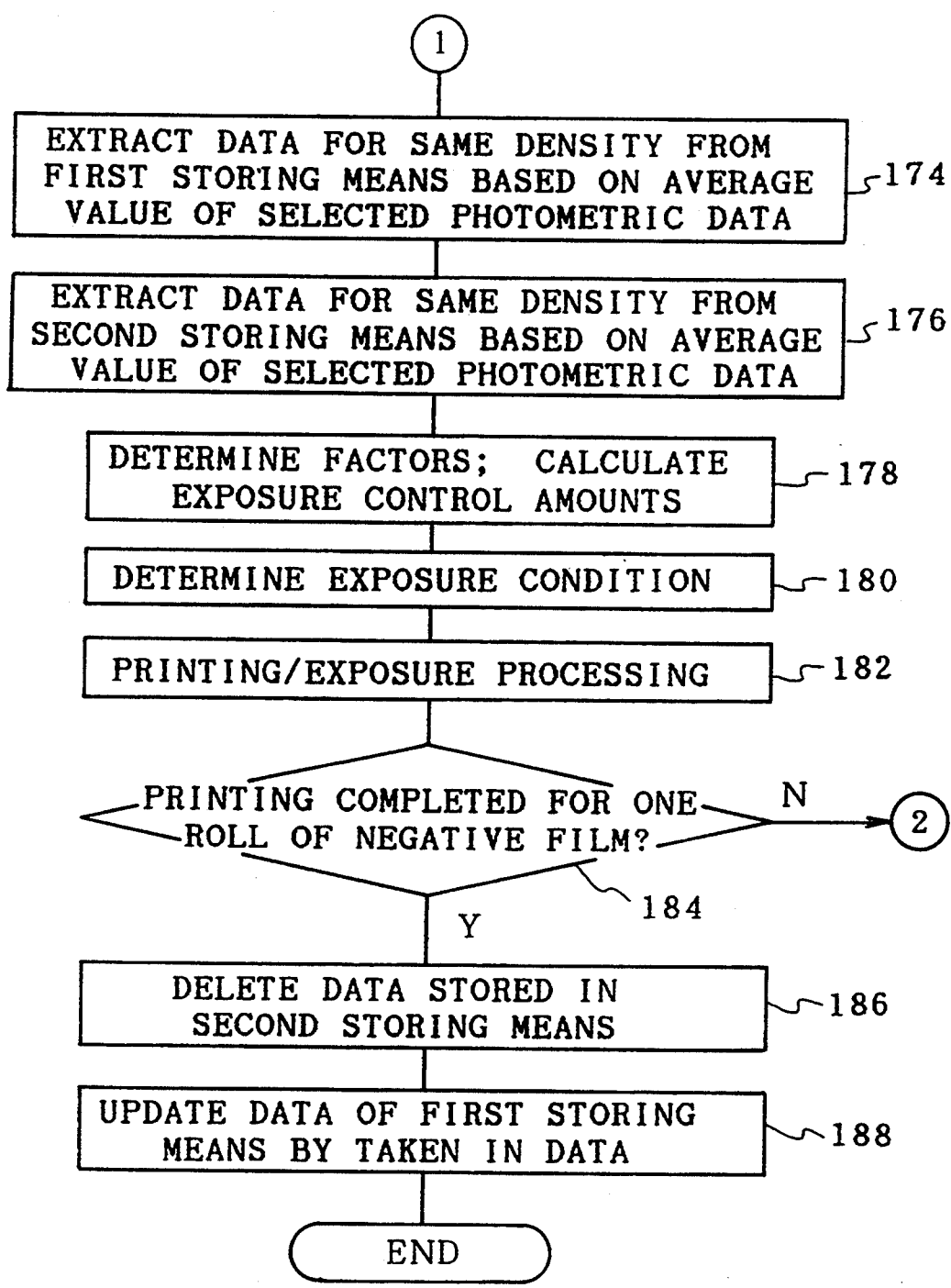

Next, an operation of the second embodiment will be described with reference to the flowcharts in FIGS. 10A and 10B. In step 150, the DX code of the negative film 20 which is set at the photographic printing apparatus 70 is read by the bar code reading device 72. In step 152, the film type is determined based on the read DX code. In step 154, data corresponding to the determined film type is taken in from the first storing means 34.

From step 156 on, the same processes are effected as those from step 100 on in the flowchart in FIG. 8. The mask densities, which are the low density portion photometric data, may be stored in advance in the first storing means 34 per film type so that in step 162, the low density portion photometric data may be determined per the film type based on the results of the determination of the film type. Further, in step 164, a standardization table is prepared by using the data read in step 154, and standardization is effected in the same way as in step 106 of the flowchart in FIG. 8. In step 170, the average value of the selected photometric data and the data taken in from the first storing means 34 is calculated by using Formula 2. The selected photometric data is thereby reflected in the data which is taken in.

In step 174, the image data MD2$_j$ for each of R, G and B for the same density are determined, from the data which was taken in, based on the average values of the selected photometric data. As described previously, because the data stored in the first storing means 34 is classified per film type, the different film characteristics of each film type are more accurately reflected than in the first embodiment so that the precision of the present embodiment is high. Accordingly, when weighting factors are set in step 178, the value of the weighting factor K2 can be made large so that the weighting of the image data MD2$_j$ is large. Therefore, a more accurate exposure condition can be obtained.

In step 184, a determination is made as to whether printing of the image frames of one roll of the negative film 20 has been completed. If the answer to the determination in step 184 is "Yes", in step 186, the data stored in the second storing means 36 is deleted. Thereafter, in step 188, the data of the first storing means 34 is updated by data reflecting the selected photometric data taken in from the first storing means 34, and processing is completed.

Figure 11:
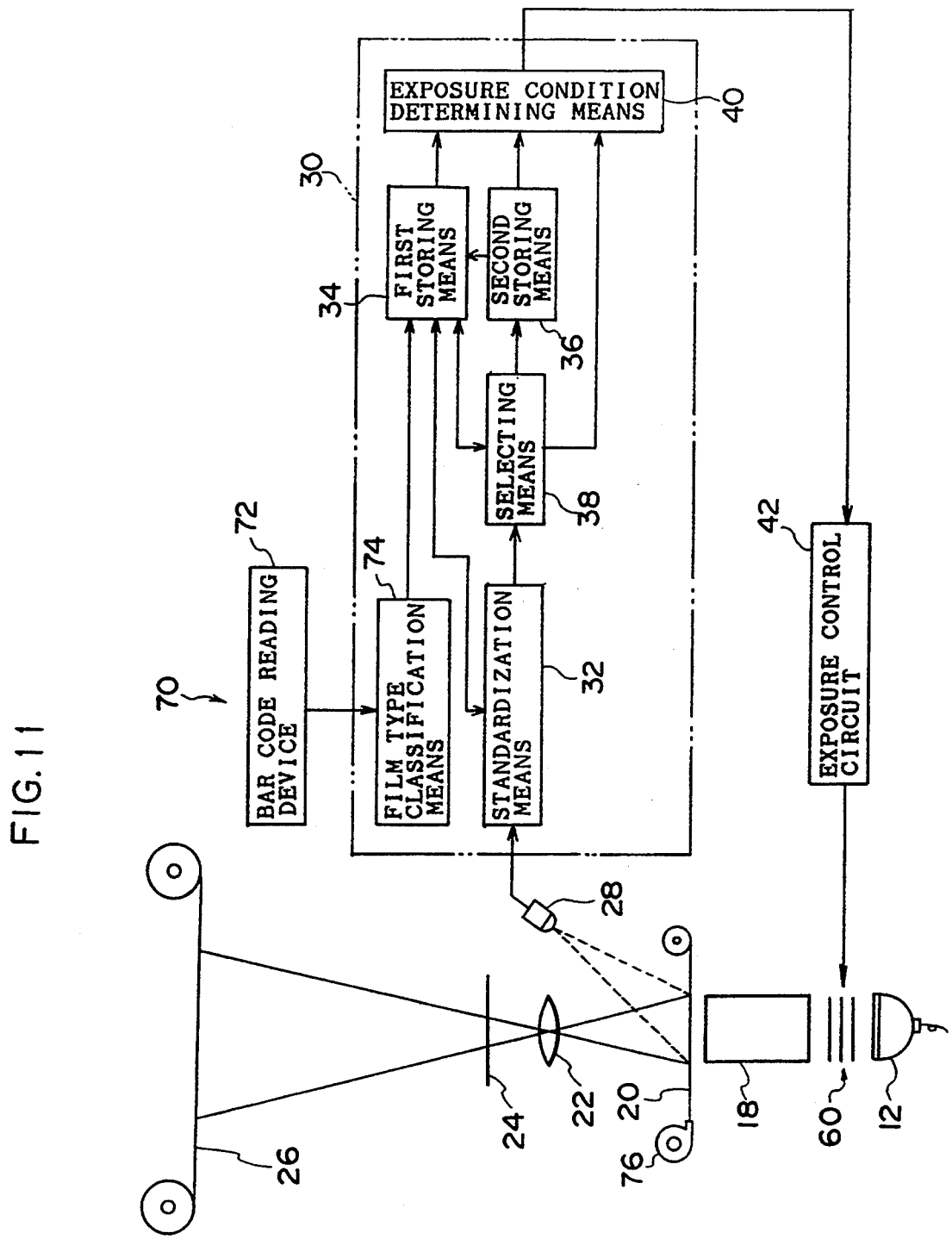
FIG. 11 is a schematic structural view illustrating another example of a photographic printing apparatus to which the present invention is applied.

In the above-described embodiment, the average values stored in the first storing means 34 are updated by using selected photometric data each time an image frame is photometrically measured. However, after photometry and printing have been completed for image frames of one roll of negative film 20, the data stored in the first storing means 34 may be updated by using the data stored in the second storing means 36 shown in FIG. 11, and the data stored in the second storing means 36 may be deleted.

In the present embodiment, the data stored in the second storing means 36 is deleted after printing of all of the image frames recorded on the negative film 20 has been completed. However, when the color and the color distribution of the image frame which is to be printed greatly differs from those of image frames which were previously printed, it can be determined that, for example, printing of a series of image frames of a certain scene is completed. It can be presumed that the color and the color distribution of the subsequent image frames will be greatly different than those of the aforementioned series of image frames. In such a case, if the above-mentioned data is deleted and the exposure condition is determined by using data stored in the first storing means 34, the pass rate of the prints when the prints are checked improves. Further, rather than deleting the data stored in the second storing means 36, the weighting factor K3 may be made small.

In the present embodiment, the selected photometric data is classified per density, and the average values are calculated for each density and stored in the first storing means 34 and the second storing means 36. However, all of the selected photometric data may be stored. Further, all of the photometric data and the average values calculated for each group when the photometric data is classified into groups by density may be stored. In the present embodiment, the exposure condition is determined by using the selected photometric data. However, the exposure condition may be determined by using standardized photometric data, data obtained by standardizing the data stored in the first storing means 34, and data obtained by standardizing the data stored in the second storing means 36 to determine the exposure correction amount with respect to the average exposure condition determined from the average densities.

In the present embodiment, the photometry, the determining of the exposure condition, and the printing processes for a specific image frame are carried out in order from the leading image frame of the negative film 20. However, for example, determination of the exposure conditions and printing can be effected successively after photometry of all of the image frames of the negative film 20 has been carried out.

Moreover, processing may also be effected in the following manner. First, photometry is carried out until the number of photometrically measured image frames reaches a predetermined number or until the number of items of selected photometric data reaches a predetermined number, and the photometric data is accumulated in the second storing means 36. Next, photometry, determination of the exposure condition, and printing is carried out for each image frame. In a case in which printing and the like are effected after photometry has been carried out until the number of photometrically measured image frames has reached a predetermined number, the portions for which photometry is effected and the portions for which printing is effected may be separated so that the photometry position and the printing position are separated by a distance corresponding to the longitudinal direction dimension of the predetermined number of image frames. In this way, a series of processes can be effected without rewinding the negative film 20.

Further, in the first printing, the order number and the average value of the selected photometric data (or all of the selected photometric data) are stored in the photographic printing apparatus 10, and the order number is printed on the reverse surface of the print. When reprinting is effected, the order number of the image frame which is to be reprinted may be entered into the photographic printing apparatus 10 so that the stored data is taken in, and the exposure condition is determined. Further, if an image is photometrically measured again and the results are compared with the data which was taken in, it can be determined whether the color of the image frame has faded.

Third Embodiment

Figure 12:
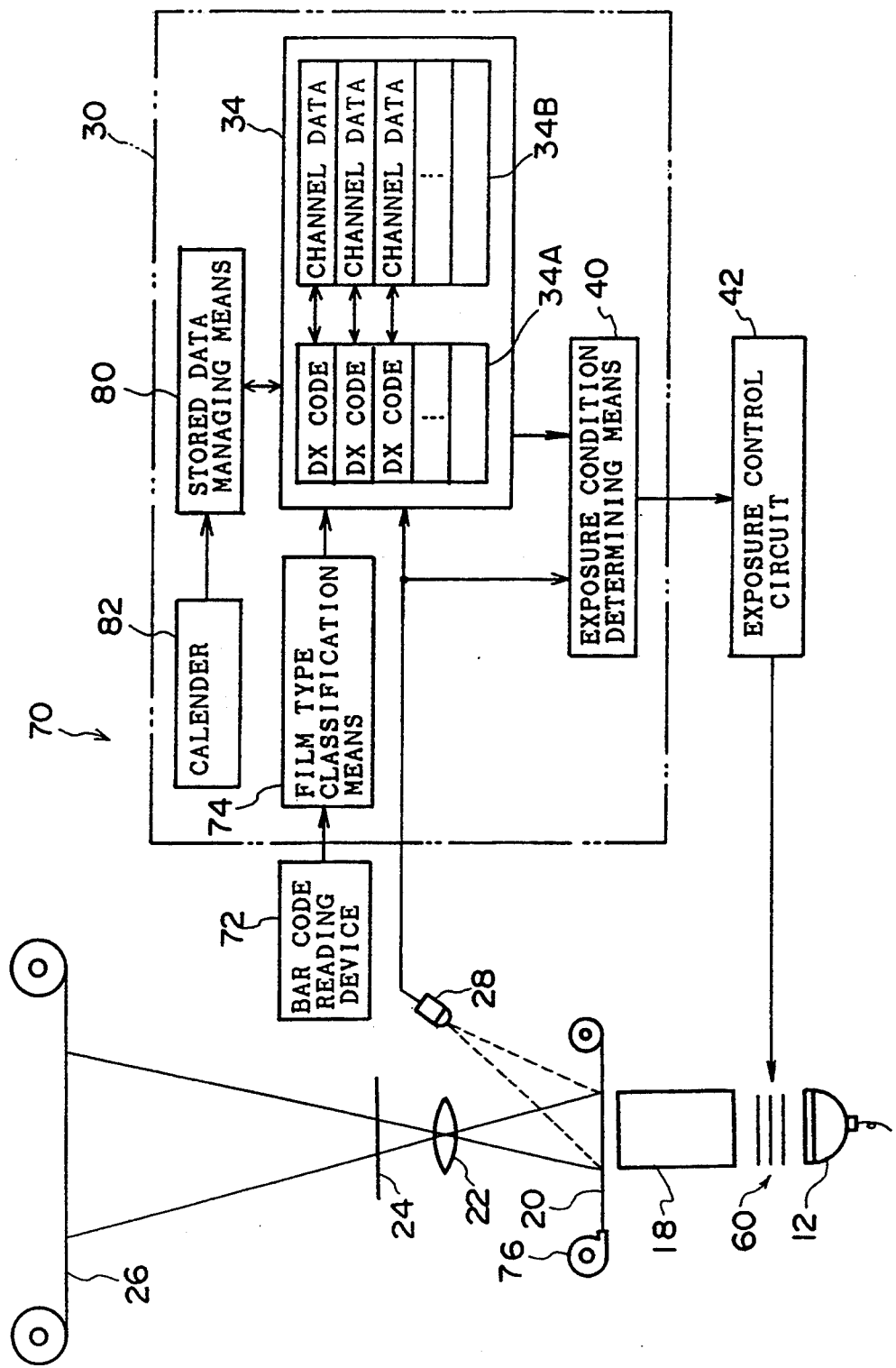
FIG. 12 is a schematic structural view of a photographic printing apparatus in accordance with a third embodiment.

A third embodiment of the present invention will be described in detail with reference to FIG. 12. The present embodiment relates to managing data. Parts in the present embodiment which are the same as those of the second embodiment are denoted with the same reference numerals and description thereof is omitted.

The first storing means 34 is provided with a DX code storing region 34A and a channel data storing region 34B. DX codes of N types of film types can be stored in the DX code storing region 34A. Channel data of N types of film types can be stored in the channel data storing region 34B. In the present embodiment, the data listed below in Table 4 is used as the channel data for each type of film.

TABLE 4

<CHANNEL DATA>

Channel Number
Name of Film
C, M, Y Color Balance Value
C, M, Y Slope Coefficients of Underexposed Frames
C, M, Y Slope Coefficients of Overexposed Frames
Last Date of Use The channel data for each film type is not limited to the data listed in Table 4. The name of the manufacturer, the film sensitivity, the base density, and the like may also be stored.

A stored data managing means 80 is connected to the first storing means 34. A calender 82 is connected to the stored data managing means 80. Each time the channel data is used, the calender 82 updates the "last date of use" area of the channel data. Based on the current date outputted from the calender 82 and the last date of use which is stored in the channel data storing region 34B of the first storing means 34, the stored data managing means 80 manages the data stored in the DX code storing region 34A and in the channel data storing region 34B of the first storing means 34.

Figure 13A:
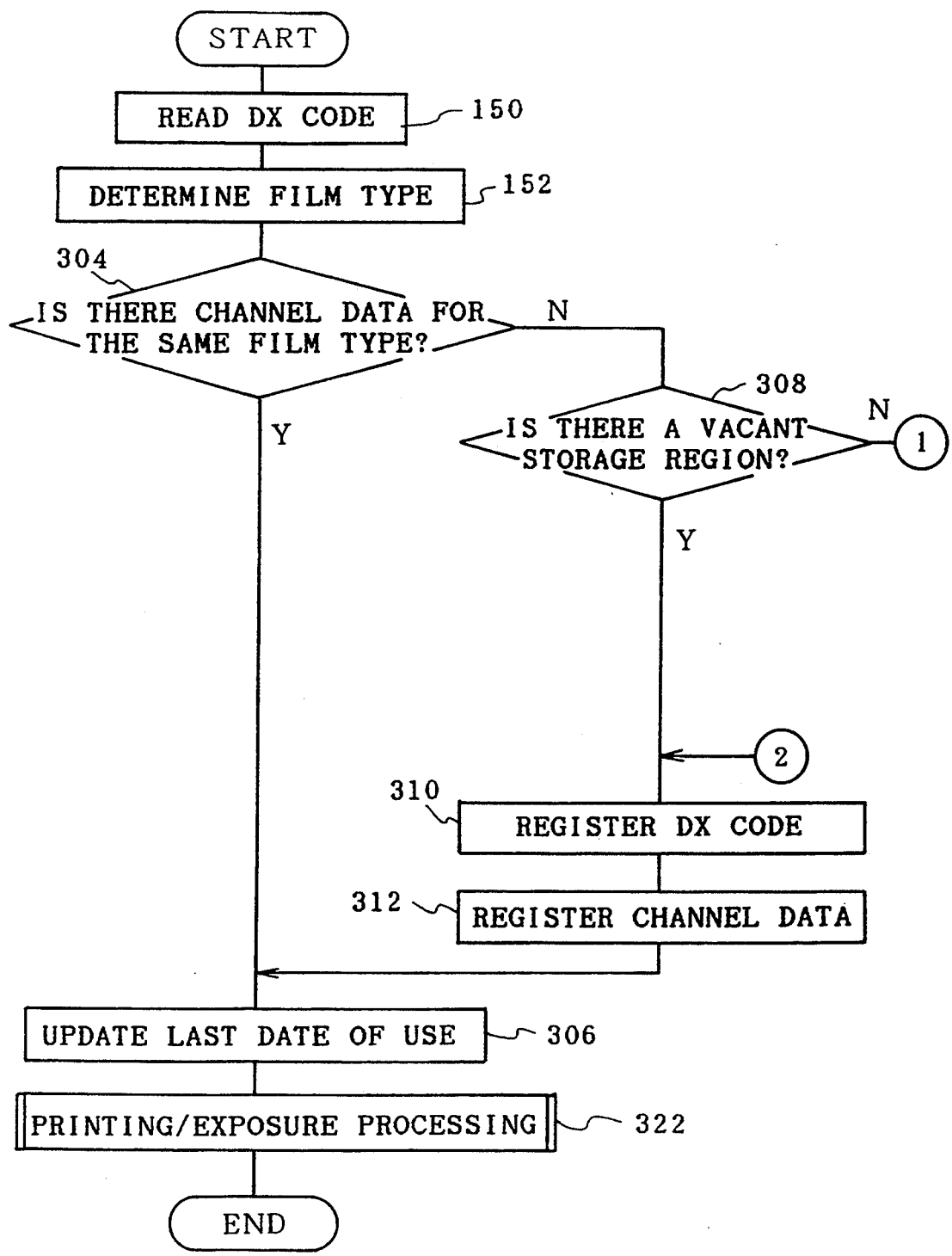
FIGS. 13A, 13B are flowcharts explaining a process of main routine of the third embodiment.
Figure 13B:
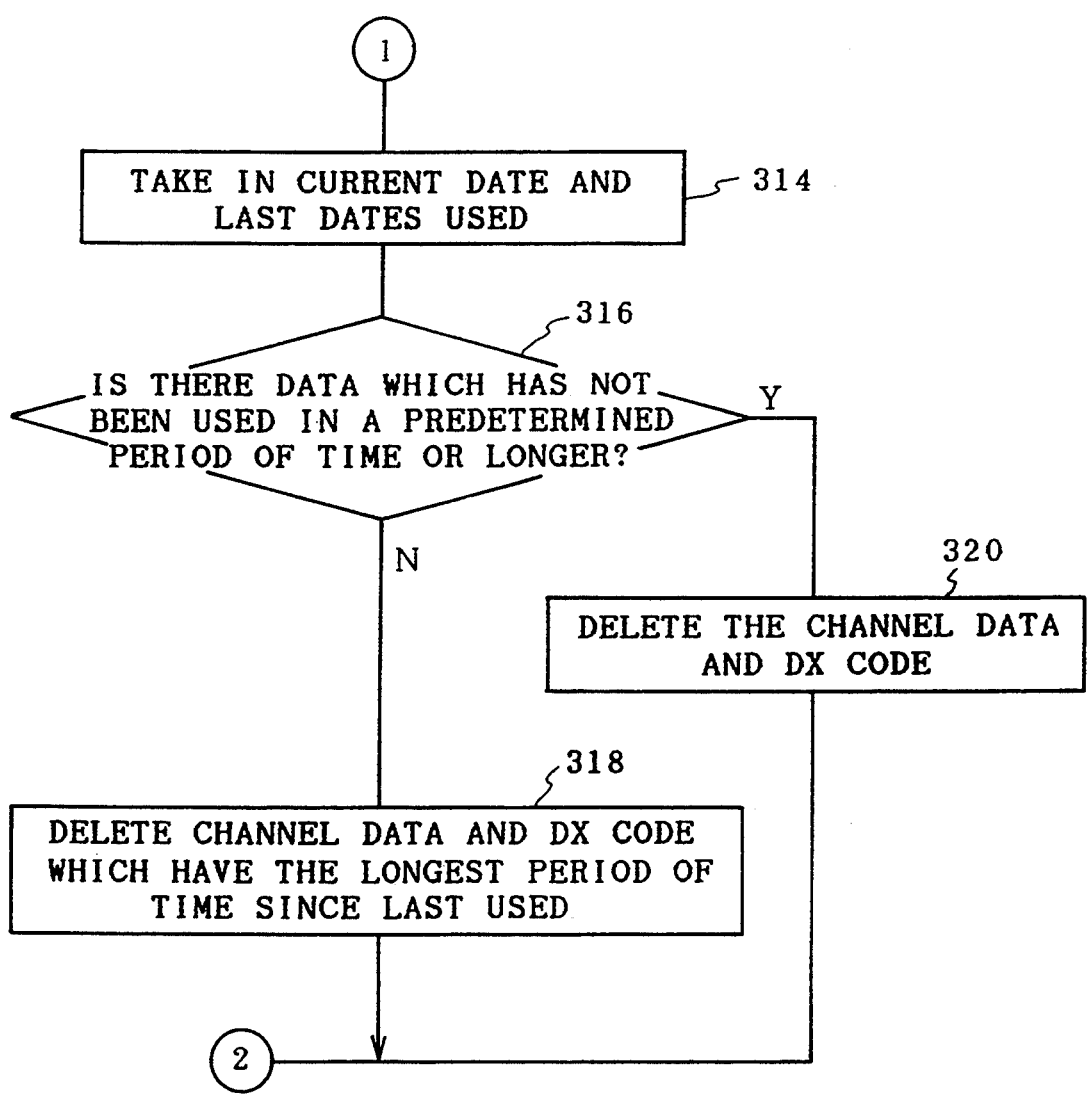

Operation of the present embodiment will now be described. First, the main routine of the third embodiment will be described with reference to the flowcharts in FIGS. 13A and 13B. The main routine is implemented when the negative film 20 is set at the photographic printing apparatus 70. In step 150, the DX code of the negative film 20 is read by the bar code reading device 72. In step 152, the film type of the negative film 20 is determined based on the DX code which was read.

In step 304, a determination is made, with reference to the data stored in the DX code storing region 34A of the first storing means 34, as to whether a DX code of a film type which is the same as the determined film type is stored. If the answer to the determination in step 304 is "Yes", the process moves to step 306 where the current date is taken in from the calender 82. The current date is set in the last date of use area as data relating to the period of use of the channel data corresponding to the DX code in the channel data storing region 34B.

On the other hand, if the answer to the determination in step 304 is "No", it is determined that the film type of the set negative film 20 is a new film type whose channel data has not yet been recorded. In step 308, a determination is made as to whether there is a vacant region in the DX code storing region 34A of the first storing means 34 in which the new DX code can be registered (stored). If the number of stored DX codes is less than N, the answer to the determination in step 308 is "Yes". In step 310, the new DX code is registered in the vacant region of the DX code storing region 34A and is registered in the memory of the film type classifying means 74 if the DX code has not already been registered therein.

In subsequent step 312, the channel data corresponding to the newly registered DX code is registered in the vacant region of the channel data storing region 34B. The channel data may be input by an operator. Alternatively, a condition setting film, which is produced by using a negative film of a film type corresponding to the registered code, may be photometrically measured by a densitometer or the like. The channel data is derived by calculation or the like based on the results of photometry, and is then registered.

If the answer to the determination in step 308 is "No", in step 314, the current date is taken in from the calender 82, and the last dates used of all of the channel data registered in the channel data storing region 34B are taken in. In step 316, the respective differences between the current date and each of the last dates used are calculated, and a determination is made as to whether there is data for which time over a predetermined period of time (e.g., 180 days) has passed since the data was last used. If the answer to the determination in step 316 is "Yes", in step 320, the channel data and the data of the DX code corresponding to that channel data are deleted from the DX code storing region 34A and the channel data storing region 34B. The process then moves on to step 310.

If the answer to the determination in step 316 is "No", in step 318, the channel data, which has the longest period of time since its last use, and the data of the DX code are deleted from the DX code storing region 34A and the channel data storing region 34B, and the process moves to step 310. Accordingly, the DX codes and the channel data of film types, which, for example, are no longer manufactured and which have not been used for awhile, and the DX codes and the channel data of film types which are used infrequently are deleted from the first storing means 34. Therefore, the increase in the amount of data stored in the first storing means 34 can be suppressed, and the storage regions of the first storing means 34 used to store the data can be made small. Further, the DX codes and the channel data stored in the first storing means 34 can be automatically managed.

In this way, vacant regions are created in the DX code storing region 34A and in the channel data storing region 34B so that a new DX code and channel data corresponding to the DX code can be registered therein by the processes in steps 310 and 312. After the process in step 312 has been carried out, the last date of use is updated in step 306 as described previously.

Figure 14:
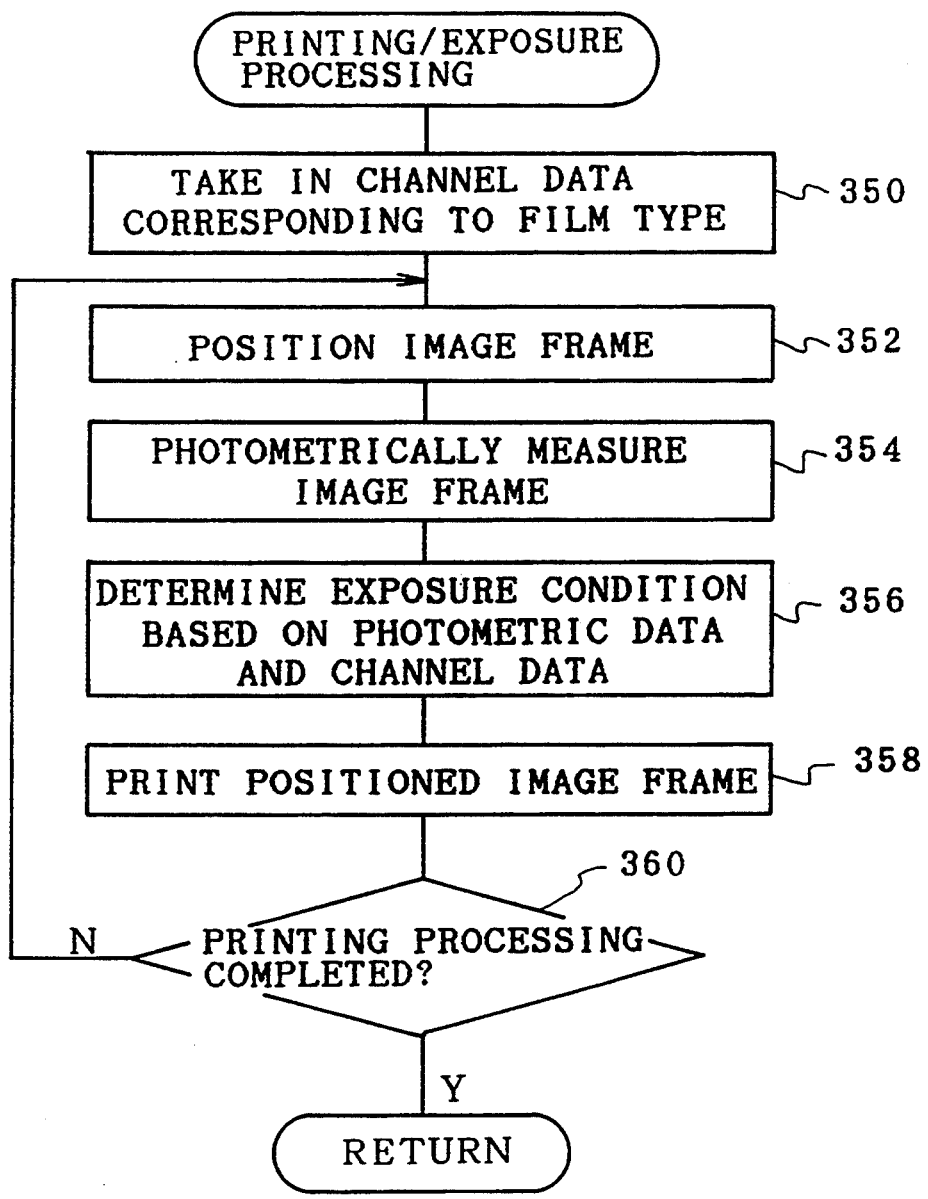
FIG. 14 is a flowchart explaining printing/exposure processing of the third embodiment.

In subsequent step 322, printing/exposure processing is effected. Details of printing/exposure processing will be described with reference to the flowchart in FIG. 14. In step 350, channel data corresponding to the film type of the negative film 20 set at the photographic printing apparatus 70 is taken in from the channel data storing region 34B. In step 352, the first image frame of the negative film 20 is positioned at the printing position. In step 354, the positioned image frame is divided into a plurality of regions and each region is photometrically measured for each of R, G and B by the photometer 28. In step 356, the exposure condition resulting from the respective exposure amounts of R, G and B is determined based on the photometric data input from the photometer 28 and the channel data taken in in step 350. The exposure condition is determined on the basis of Formula 7.

The average values of the photometric data can be used for the exposure control amounts $D_{ij}$. However, it is preferable to calculate the exposure control amounts $D_{ij}$ by using only the selected data, as explained in the first and second embodiments, or by using only the photometric data, which was selected from photometric data belonging to a specific region on a predetermined color coordinate system, as described in the fourth embodiment. Further, as the reference negative film, it is desirable to use an exposure condition setting film, which is produced by using a negative film of the film type for which printing is to be effected. However, an exposure condition setting film which is produced by using a negative film of a reference type may be used.

In step 358, the exposure condition, which results from the respective, determined amounts of exposure of R, G and B, is set in the exposure control circuit 42, and the image frame positioned at the printing position is printed/exposed onto the color paper 26 at the exposure condition by the exposure control circuit 42. In step 360, a determination is made as to whether printing has been completed for all of the image frames of the negative film 20 set at the photographic printing apparatus 70. If the answer to the determination in step 360 is "No", the process returns to step 352, and the processes of positioning at the printing position, photometric measuring, determination of the exposure condition, and printing are carried out successively for the image frames. All of the image frames of the negative film 20 are thereby printed onto the color paper 26.

Fourth Embodiment

Next, a fourth embodiment of the present invention will be described. Parts which are the same as those of the third embodiment are denoted by the same reference numerals, and description thereof is omitted.

Figure 15:
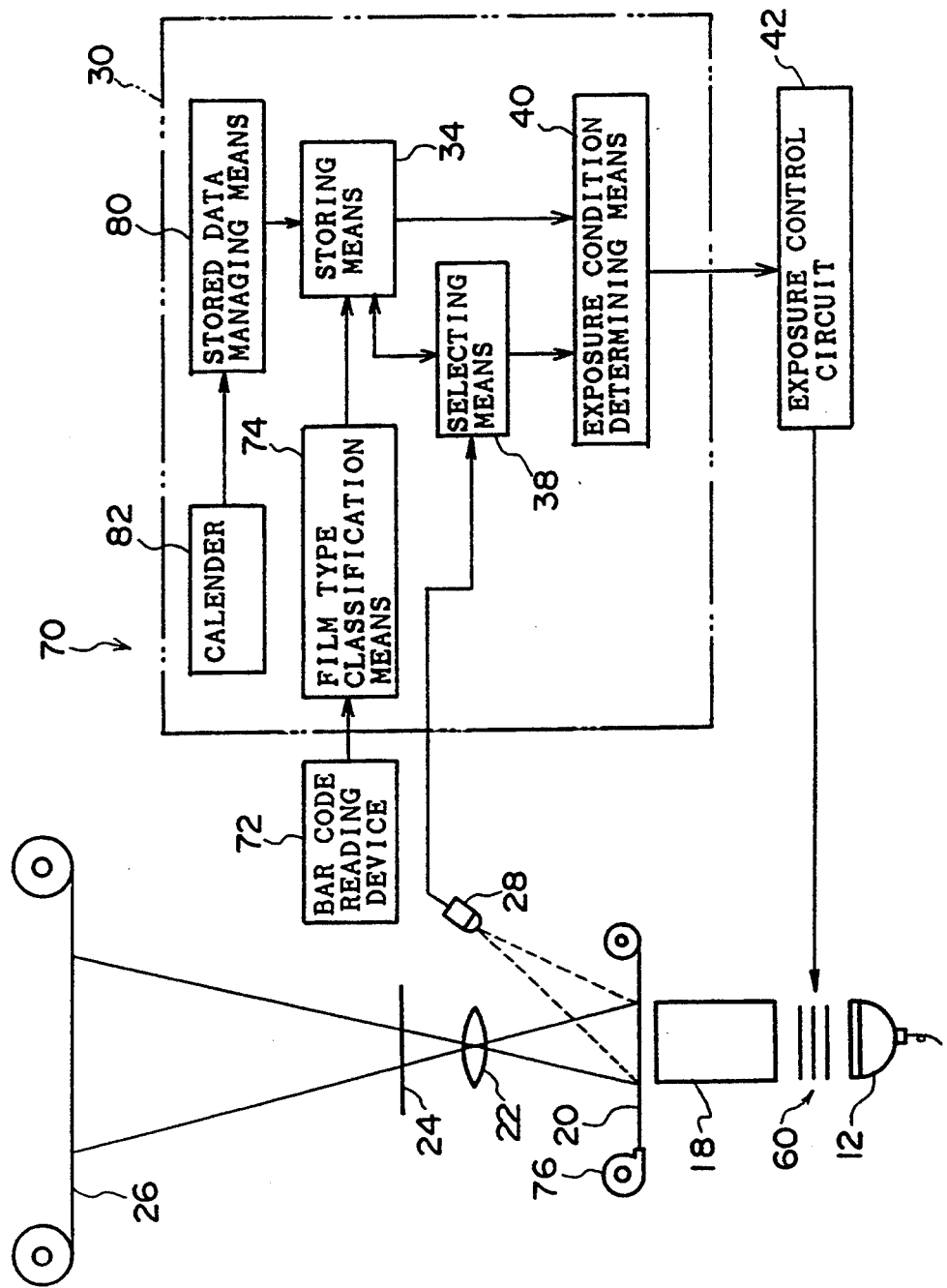
FIG. 15 is a schematic structural view of a photographic printing apparatus in accordance with a fourth embodiment.

As illustrated in FIG. 15, the selecting means 38 is provided in the photographic printing apparatus 70 of the fourth embodiment. The selecting means 38 is connected to the first storing means 34 and the exposure condition determining means 40. Photometric data obtained by the photometer 28 is input to the selecting means 38. The selecting means 38 selects, from the inputted photometric data, only the photometric data which is necessary to determine the exposure condition, and outputs this essential data to the first storing means 34 and the exposure condition determining means 40.

The first storing means 34 of the present embodiment corresponds the photometric data input from the selecting means 38 to the DX codes of the various film types, and stores the photometric data. Further, the date when the photometric data was stored, or the dates when the photometric data was used, and the date when the photometric data was last used (last date of use) are stored in the first storing means 34. An example of this data is illustrated in Table 5.

TABLE 5

| Film Type | A | B | C | ... |
|---|---|---|---|---|
| DX Code | (aaaaaaaa) | (bbbbbbbb) | (cccccccc) | ... |
| Dates Used | 1990.01.10 | 1988.02.03 | 1991.10.01 | |
| | . | . | . | |
| | . | . | . | |
| | . | . | . | |
| | 1992.04.01 | 1992.03.20 | | |
| Last Date of Use | 1992.04.01 | 1992.03.20 | 1991.10.01 | ... |
| Photometric Data | $D_{A1}, D_{A2}$ | $D_{B1}, D_{B2}$ | $D_{C1}, D_{C2}$ | ... |
| | $D_{A3}, D_{A4}$ | $D_{B3}, D_{B4}$ | $D_{C3}, D_{C4}$ | ... |
| | $D_{A5}, D_{A6}$ | $D_{B5}, D_{B6}$ | $D_{C5}, D_{C6}$ | ... |
| | $D_{A7}, D_{A8}$ | $D_{B7}, D_{B8}$ | $D_{C7}, D_{C8}$ | ... |
| | . | . | . | |
| | . | . | . | |
| | . | . | . | |

In Table 5, the dates when the photometric data is used are stored. However, the date when the photometric data was stored in the first storing means 34 may be stored in addition to the dates of use. Alternatively, it suffices if only the storing date is stored.

Figure 23A:
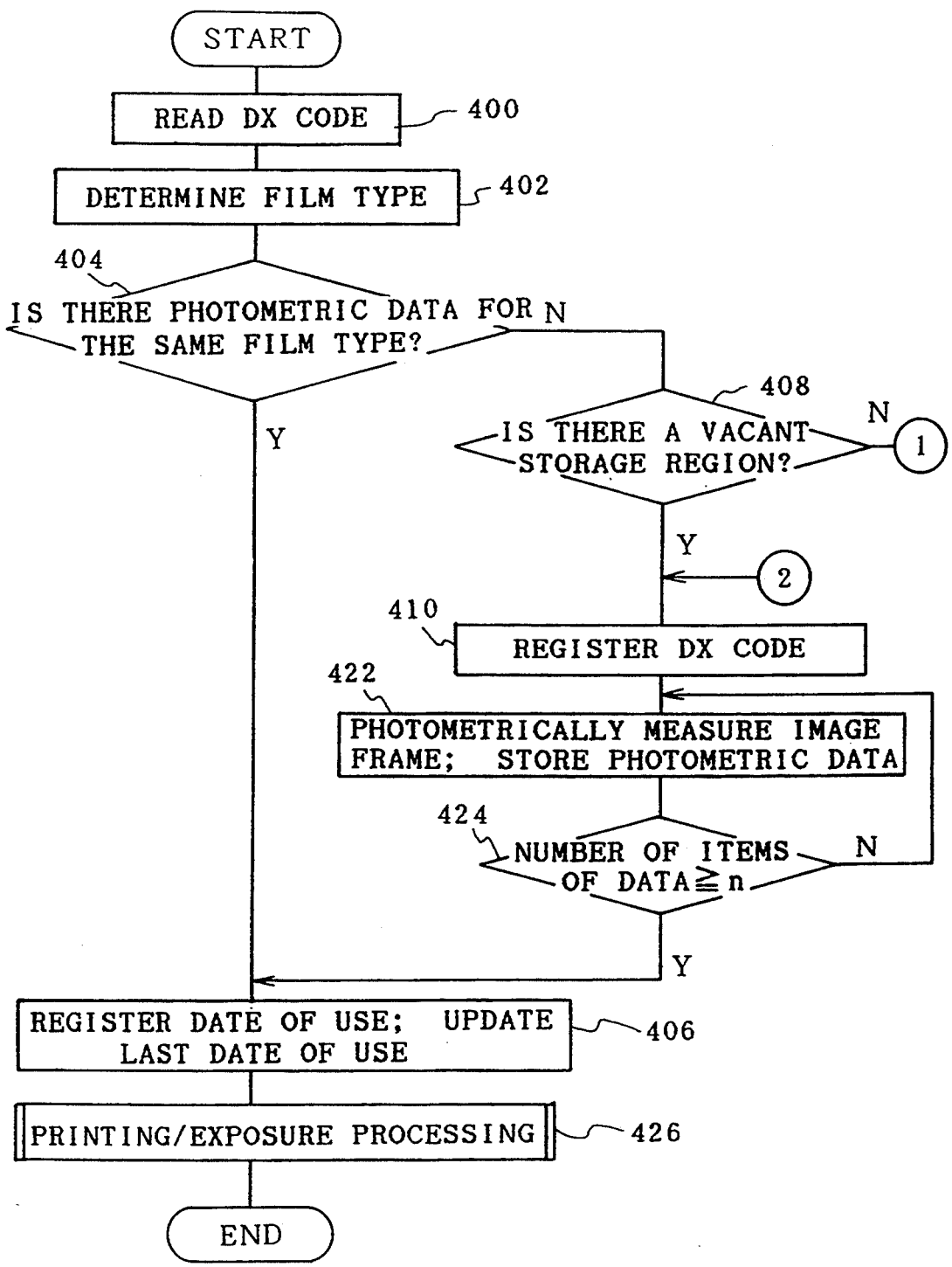
FIGS. 23A, 23B are flowcharts explaining a main routine of the fourth embodiment.
Figure 23B:
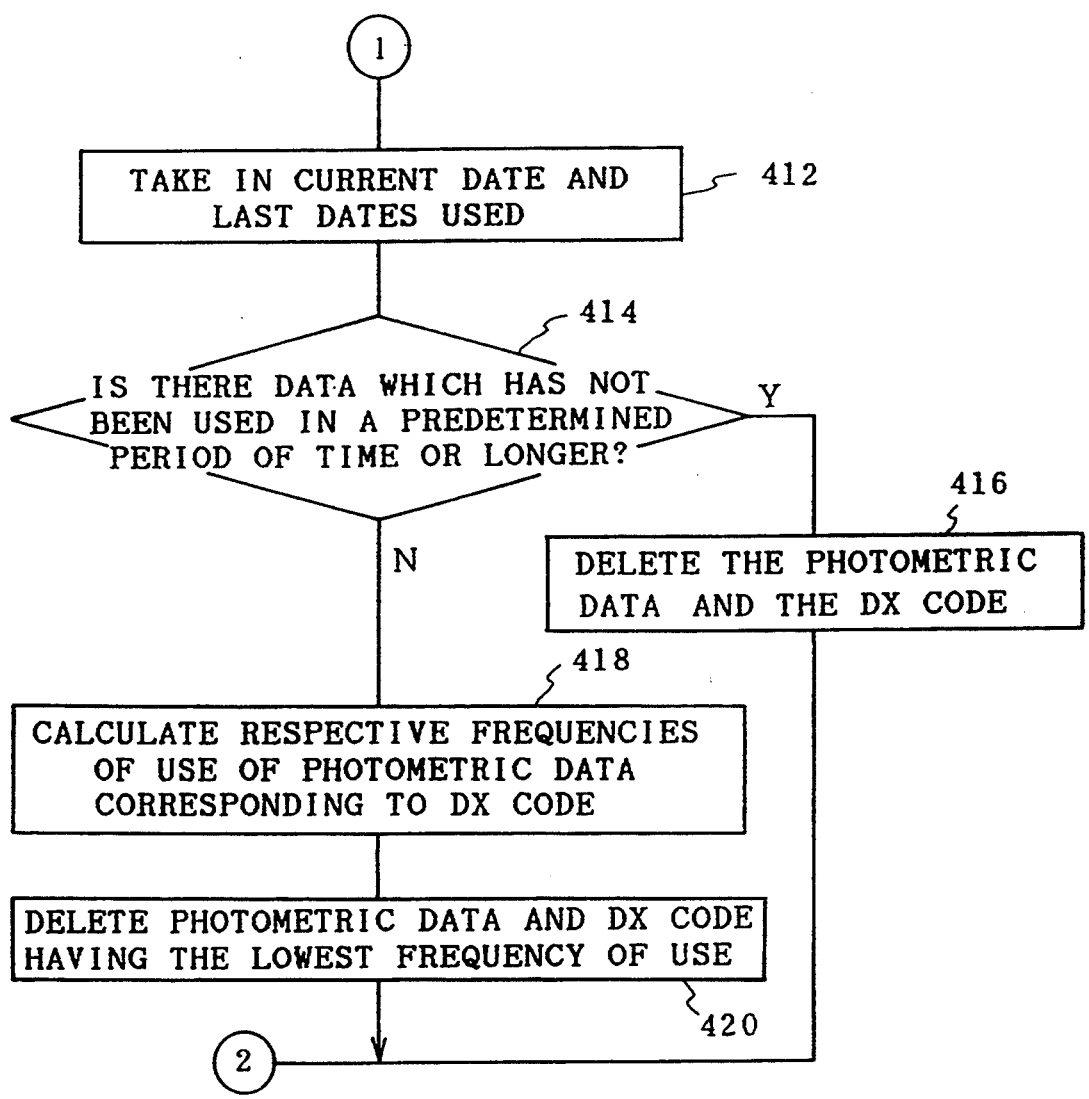
Figure 24:
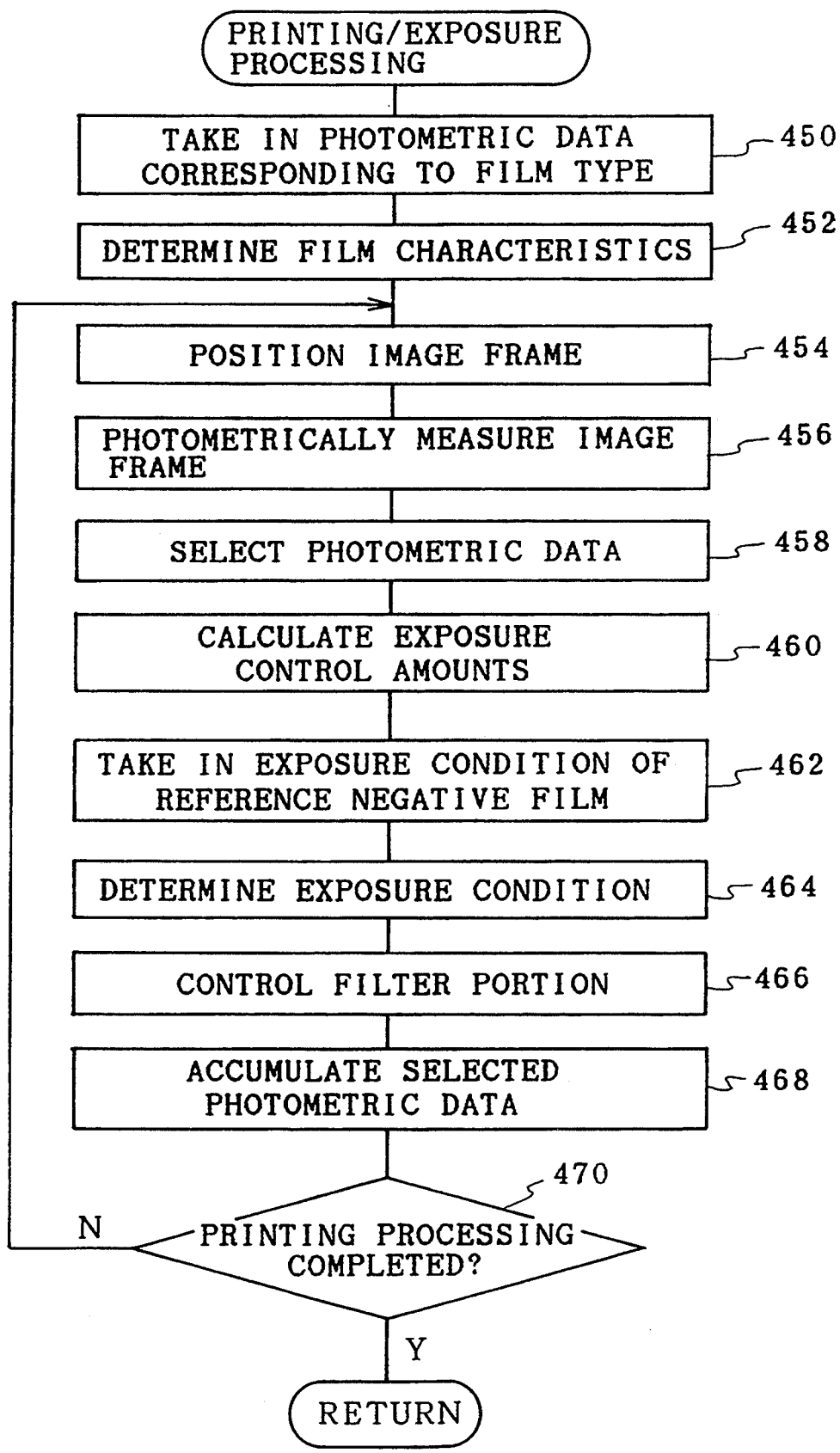
FIG. 24 is a flowchart explaining printing/exposure processing of the fourth embodiment.

Next, operation of the fourth embodiment will be described with reference to the flowcharts in FIGS. 23A, 23B, and 24. FIGS. 23A and 23B illustrate the main routine of the fourth embodiment. In step 406, the last date of use is updated and the date of use is registered. Step 406 is carried out before step 426 in which printing/exposure processing is effected by using the photometric data stored in the first storing means 34, as will be described later. Accordingly, each time a specific film type is subject to printing processing, the date of use is recorded in order in the "dates used" area of the photometric data which is provided in the memory of the first storing means 34 and which corresponds to the DX code of the film type.

Further, when photometric data of a new DX code is to be registered and a determination is made that there are no vacant storage regions and that there is no data which has not been used in a period of time exceeding the predetermined period (i.e., when the answer to the determination in step 414 is "No"), in step 418, the frequencies of use of the photometric data corresponding to each of the DX codes are calculated based on the dates of use and the last dates of use of the photometric data belonging to each of the DX codes. The frequencies of use may be calculated by calculating the numbers of times the respective data were used since the times when the DX codes were recorded. Alternatively, the frequencies of use in a fixed period of time (e.g., the previous one year) may be calculated. In step 418, the frequencies of use of the photometric data of the respective DX codes are calculated, and in step 420, the photometric data and the DX code having the lowest frequency of use are deleted.

Accordingly, the DX codes and the photometric data of film types, which, for example, are no longer manufactured and which have not been used for awhile, and the DX codes and the photometric data of film types which are used infrequently are deleted from the first storing means 34. Therefore, the increase in the amount of data stored in the first storing means 34 can be suppressed, and the storage regions of the first storing means 34 used to store the data can be made small. Further, the data stored in the first storing means 34 can be automatically managed.

When there is a vacant storage region, or when a vacant space is created by the process in step 416 or the processes in steps 418 and 420, the new DX code is registered in the vacant region in step 410. In subsequent step 422, the photometric data obtained by photometric measuring of the image frame by the photometer 28 is stored in the vacant region. In step 424, a determination is made as to whether the number of stored items of photometric data is greater than or equal to a value n which is determined in advance. When the answer to this determination is "No", the process returns to step 422, and the image frames recorded on the negative film 20 are successively subject to photometry, and the photometric data is stored. At this time, it is preferable to select from this photometric data, as will be described later, photometric data which belongs to a specific region on a predetermined color coordinate system, and to store only the selected photometric data in the first storing means 34.

In order to further reduce the storage regions of the first storage means 34, for example, the photometric data is accumulated until the time when the number of items of photometric data for each film type becomes a predetermined value $n_0 (\geq$ the predetermined value n). After the number of items of photometric data per film type reaches the predetermined value $n_0$, the accumulation of photometric data may be stopped, or photometric data which was stored long ago may be deleted and new photometric data may be stored in order to maintain the number of items of photometric data for each film type at the predetermined value $n_0$.

The details of printing/exposure processing of step 426 will now be described with reference to the flowchart shown in FIG. 24. In step 450, in the photometric data stored in the first storing means 34, the photometric data which corresponds to the film type is taken in. In step 452, the film characteristics of the film type are determined based on the photometric data which was taken in.

Figure 16:
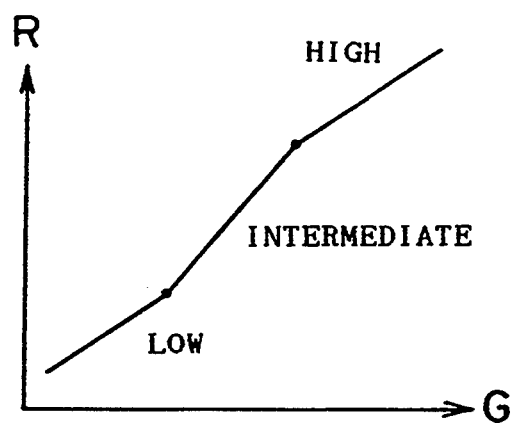
FIGS. 16 and 17 are respectively diagrammatic views illustrating examples of characteristic curves.
Figure 17:
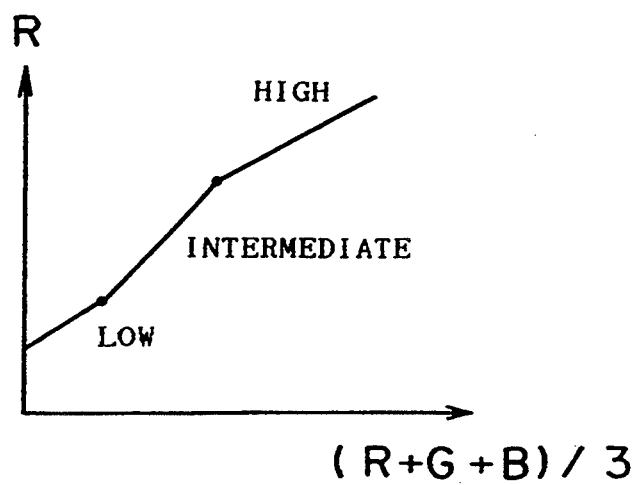

The following is a description of an example in which the film characteristic curves are used as the film characteristic. First, a reference value (for example, the green density or the average density of R, G and B, i.e., (R+G+B)/3, or the like) of the negative film 20 to be printed is calculated based on the respective photometric data for R, G and B which were taken in. The characteristic curves of the negative film 20 for each of R, G and B are determined by determining respective ratios of the R, G and B densities of the photometric data to the reference value. FIG. 16 illustrates the characteristic curves of the R density with respect to the G density. FIG. 17 illustrates the characteristic curves of the R density with respect to the (R+G+B)/3 density.

Figure 18A:
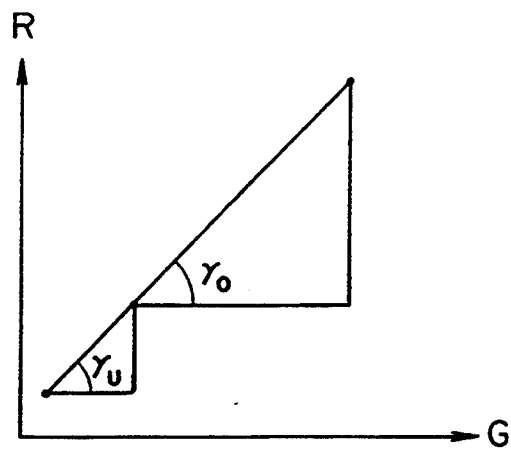
FIGS. 18A, 18B, and 18C are diagrammatic views for explaining film characteristics.
Figure 18B:
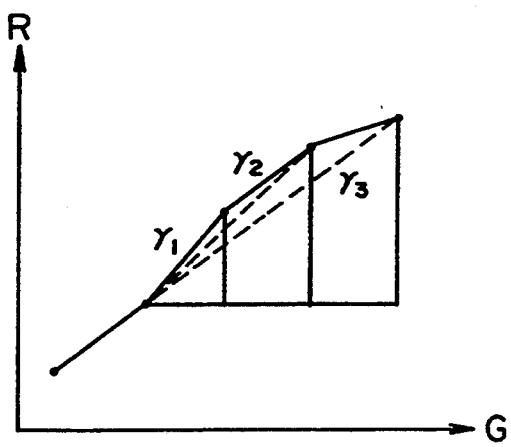
Figure 18C:
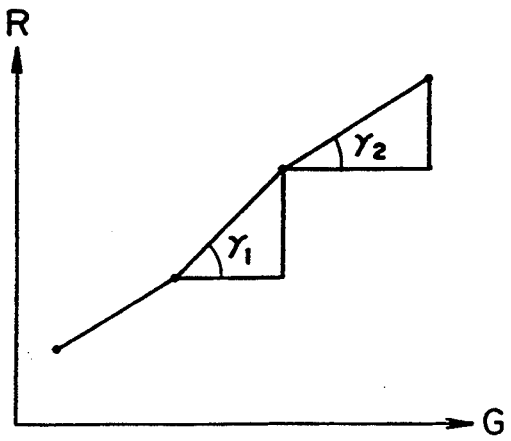

As the film characteristic from the characteristic curves, for example, as shown in FIG. 18A, the slope $\gamma_u$ of the underexposed portion and the slope $\gamma_o$ of the overexposed portion can be used. Further, the average value of the slopes $(\gamma 1+\gamma 2+\gamma 3)/3$, as illustrated in FIG. 18B, can be used. Alternatively, the slopes $\gamma 1$ and $\gamma 2$ illustrated in FIG. 18C can be used.

Figure 19:
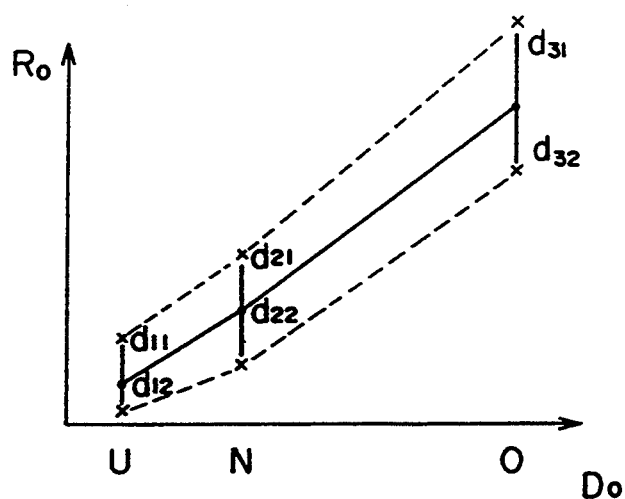
FIG. 19 is a diagrammatic view illustrating regions for selecting photometric data.
Figure 20:
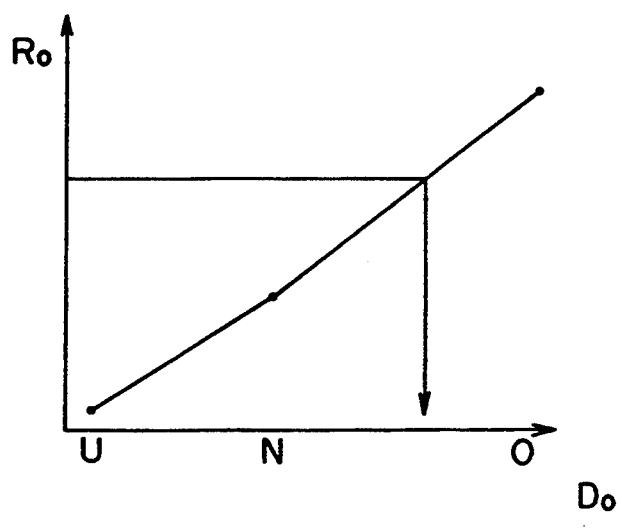
FIG. 20 is a diagrammatic view illustrating a curve for converting photometric data.

In step 452, in order to select the photometric data, as will be described later, the relations illustrated in FIGS. 19 and 20 are determined as film characteristics and are stored in a table or in the form of a functional expression. Further, the film characteristics may be stored in advance.

In step 454, the image frame is positioned at the printing position. In step 456, the positioned image frame is photometrically measured by the photometer 28 for each of R, G and B. In step 458, the photometric data, which is used in calculating the exposure control amounts as will be described later, is selected, from the photometric data obtained by photometry in step 456, based on the determined film characteristics. With regard to the process of selection, photometric data belonging to a specific color region (for example, a color region including a neutral color (gray) and flesh color) which is imagined on a color coordinate system having the difference $(R'-G')$ between R and G and the difference $(G'-B')$ between G and B as the respective axes, is selected in accordance with the film characteristics. Hereinafter, a method of selecting photometric data belonging to a specific color region will be described.

First, in aforementioned step 452, curves such as that illustrated in FIG. 19 are prepared for $R_0$, $G_0$, $B_0$, respectively, by using the densities $R_0$, $G_0$, $B_0$ of the three colors of the average negative film and the average density of the three colors $D_0=(R_0+G_0+B_0)/3$. In step 458, in order to select data of a region which is near the specified region, amounts of offset $d_{11}$, $d_{12}$, $d_{21}$, $d_{22}$, $d_{31}$, $d_{32}$ from the above-mentioned line are determined for underexposure, normal exposure, and overexposure, respectively. The regions defined by the broken lines in FIG. 19 are thereby determined. The average value D: $(R+G+B)/3$ of the photometric data R, G and B resulting from the densities of the three colors is determined. A determination is made as to whether the photometric data R with respect to the average value D is included within the regions defined by the broken lines in FIG. 19. In the same way, determinations are made as to whether the photometric data G and B are included in the regions within the broken lines such as those of FIG. 19 which relate to G and B, respectively.

Only in cases in which the photometric data R, G and B for all three colors are included in the regions such as those determined in FIG. 19 for the densities $R_0$, $G_0$, $B_0$ of the average negative film, these photometric data are selected and used to calculate the exposure control amounts. In the photometric data R, G and B, photometric data which is not included in the regions is not used to calculate the exposure control amounts. Or, this photometric data which is not included in the regions is converted into an average value of the photometric data R, G and B, an average value of the photometric data belonging within the regions defined by the broken lines in FIG. 19, or the like, and is used commonly in the exposure control amounts of the three colors. Further, it is preferable that the offset amounts $d_{11}$ through $d_{32}$ are changed according to the type of film or according to the slopes $R_0/D_0$, $G_0/D_0$, $B_0/D_0$.

Further, the selection of the photometric data may be effected in the following manner. In step 452, the characteristic curves described in FIG. 19 with regard to the densities $R_0$, $G_0$, $B_0$ of the average negative film are determined as shown in FIG. 20. In step 458, subsequently, using these characteristic curves, the photometric data R, G and B are converted to $D_0$ by a method such as that described in Japanese Patent Application Laid-Open No. 60-27352, and $R'$, $G'$, $B'$ are determined. Due to this conversion, photometric data having the same color balance as the average negative film are converted to equal densities $R'$, $G'$, $B'$. A determination is made as to whether $R'$, $G'$, $B'$ are to be used in calculating the exposure control amounts on a chromaticity diagram. When selecting the photometric data to be used in calculating the exposure control amounts, selective weighting of the photometric data may be effected as described in Japanese Patent Application Laid-Open No. 61-198144 or Japanese Patent Application Laid-Open No. 61-223731.

In step 460, the selected photometric data is classified by, for example, a method described in Japanese Patent Application Laid-Open No. 61-198144, Japanese Patent Application Laid-Open No. 61-223731, or Japanese Patent Application Laid-Open No. 61-232442. The exposure control amounts are calculated from the density values determined on the basis of this classification.

Namely, first, a point corresponding to a specific color region is set as the origin, and the photometric data is standardized. Next, $R'-G'$, $G'-B'$ are calculated by using the photometric data $R'$, $G'$, $B'$ of the standardized R, G and B. A color region, as shown in FIG. 21, is determined for each measuring point (each pixel) by a color coordinate table. Measuring points belonging to color regions of a closed region on the color coordinate system including a neutral color or flesh color, or color regions of a closed region on the color coordinate system including a neutral color and flesh color (e.g., 0 regions (neutral color) and 1, 3 regions (flesh color) in FIG. 21) are selected. The photometric data before the selected measuring points are standardized is added, and average values are determined for R, G and B, respectively. These average values are the exposure control amounts. Because these exposure control values do not include density values which generate color failure, the exposure control values can be used in determining the exposure amounts without causing the degree of color correction to deteriorate.

In step 462, the printing exposure condition of the reference film type, e.g., Super HG 100 (trade name of a film manufactured by Fuji Photo Film Co., Ltd.), which is stored in advance in the memory or the like, is taken in. At least one of the following can be used as the printing exposure condition: the exposure amounts or the exposure time for R, G and B, respectively, the amount of movement of the filter, light source luminance, light source voltage, the slope control value, and the density control value. The printing exposure condition of the reference film type is set by using an exposure condition setting film prepared by printing a predetermined image onto a negative film of the reference film type.

In step 464, printing exposure conditions resulting from the respective exposure amounts of R, G and B of the image frame to be printed are determined by using the exposure control amounts calculated in step 460 and the printing exposure conditions of the reference film type which were taken in as described above. An example of this exposure condition determination will be described in detail hereinafter.

When the respective normal densities (corresponding to the printing exposure conditions of the reference film type) used to set the printing conditions of the three colors R, G and B of the reference film type are set respectively to RN, GN, BN, and the exposure control amounts of the three colors R, G and B of the negative film which is to be printed are set respectively to DR, DG, DB, the exposure amounts er, eg, eb of the three colors R, G and B are expressed as follows.

$$\begin{pmatrix} \log er \\ \log eg \\ \log eb \end{pmatrix} = \begin{pmatrix} X11 & X12 & X13 \\ X21 & X22 & X23 \\ X31 & X32 & X33 \end{pmatrix} \begin{pmatrix} dR \\ dG \\ dB \end{pmatrix} \quad (8)$$

Here, $dR = DR - RN$, $dG = DG - GN$, $dB = DB - BN$. X11 through X33 are factors expressed by the following formulae:

$$\left. \begin{array}{l} X11 = SC(1.0 + 2.0 A_R)/3 \\ X12 = X13 = SC(1.0 - A_R)/3 \\ X21 = X23 = SM(1.0 - A_G)/3 \\ X22 = SM(1.0 + 2.0 A_G)/3 \\ X31 = X32 = SY(1.0 - A_B)/3 \\ X33 = SY(1.0 + 2.0 A_B)/3 \end{array} \right\} \quad (9)$$

wherein SC, SM, SY are respective slope control values corresponding to R, G and B; when $dR > 0$, $dG > 0$, $dB > 0$, then SC=SCO, SM=SMO, SY=SYO (wherein O represents overslope); when $dR < 0$, $dG < 0$, $dB < 0$, then SC=SCU, SM=SMU, SY=SYU (wherein U represents underslope). Further, $A_R$, $A_G$, $A_B$ (expressed as $A_j$ in general formula) are color correction values for R, G and B, respectively.

Next, Formula (8) is expanded, and Formula (9) is substituted therein. When Formula (8) is transformed as $(dR+dG+dB)/3=dW$, Formula (10) is obtained.

$$\log er = SC \{A_R(dR-dW)+dW\}$$

$$\log eg = SM \{A_G(dG-dW)+dW\}$$

$$\log eb = SY \{A_B(dB-dW)+dW\} \quad (10)$$

Here, $A_j = 1.0$.

Figure 22:
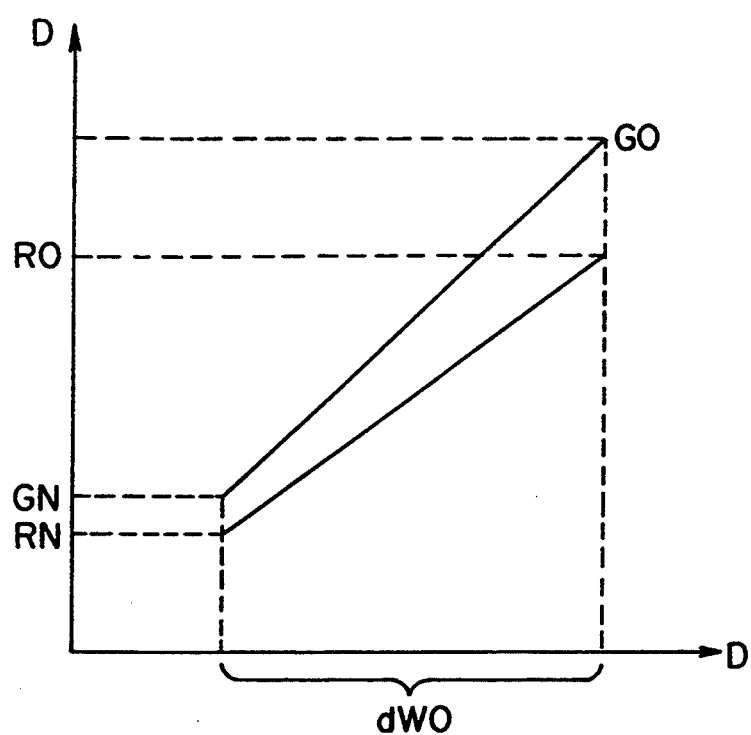
FIG. 22 is a diagrammatic view for explaining a gamma balance value.

Further, in the present embodiment, a gamma balance correction value $P_j$ is used to make a standard film of the reference film type a reference for color balance. A value corresponding to the inverse of the $\gamma$ value of the reference film type may be used as the correction value $P_j$. As illustrated in FIG. 22, when the average value dWO of the three colors of the over-densities R, G and B, which is used as a reference for the normal density, is set so that:

$$dWO = \{(RO-RN)+(GO-GN)+(BO-BN)\}/3 \quad (11),$$

then $P_j(P_R, P_G, P_B)$ become:

$$P_R = dWO/(RO-RN)$$

$$P_G = dWO/(GO-GN)$$

$$P_B = dWO/(BO-BN) \quad (12)$$

Accordingly, the exposure amounts er, eg, eb are shown by Formula (13).

$$\log er = SC\{A_R \cdot P_R(dR-dW)+dW\}$$

$$\log eg = SM\{A_G \cdot P_G(dG-dW)+dW\}$$

$$\log eb = SY\{A_B \cdot P_B(dB-dW)+dW\} \quad (13)$$

Exposure amounts Er, Eg, Eb are determined with respect to the exposure amounts er, eg, eb in above Formula (13) by taking into account the intrinsic parameters of an automatic printer, the parameters of a copy photosensitive material, and the like. Further, by applying RU, GU, BU with respect to RO, GO, BO which were described above, RU, GU, BU can also be applied in the same way with respect to the low density portions.

In step 466, the light-adjusting filter section 60 is controlled so that the image frame positioned at the printing position is printed onto the color paper 46 at the exposure amounts Er, Eg, Eb determined as described above. In step 468, the selected photometric data, which was used when the exposure control amounts were calculated, is stored in the corresponding photometric data area of the first storing means 34. Accordingly, when a plurality of rolls of negative film 20 are subject to printing processing, data regarding the image frames of the plurality of negative films 20 are accumulated, and the accuracy of the film characteristics determined in step 452 improves. In a next step 470, a determination is made as to whether printing processing has been completed for the image frames recorded on one roll of the negative film 20. If the answer to the determination in step 470 is "No", the process returns to step 454. The processes of steps 454 through 470 are repeated until the answer to the determination in step 470 is "Yes". When the answer to the determination in step 470 is "Yes", the process is completed.

Accordingly, in the fourth embodiment, various types of films can be printed well by correcting the printing exposure condition of the reference film type in accordance with the film characteristics. Therefore, by merely setting the printing exposure condition of the reference film type, high-quality printing with respect to the exposure from under-exposure to over-exposure of various types of films can be effected. Further, the printing exposure condition of the reference film type is taken as a reference, the photometric data is selected, the exposure condition is set in accordance with the film characteristics, and each type of film is printed. Therefore, even in cases in which the respective characteristics of the film processor, the negative film, the photographic printing apparatus or the like vary, it suffices to manage only the printing exposure condition of the reference film type. Appropriate management of the printing exposure condition can thereby be easily carried out. Moreover, because an appropriate condition for each type of film is automatically set, appropriate printing can be effected for each type of film.

In the above description, the dates of use of the data are stored in order. However, an easier method is storing the initial date of use (or the date when the DX code was registered) and the final date of use, and updating the final date of use each time the data is used. Alternatively, it suffices to store and update only the final date of use, as in the third embodiment. Further, a system in which the dates of recording the DX codes are stored and data is deleted in order from the oldest code is also applicable to and included in the present invention.

The stored "date" of use of the data may be the year/month/day, year/month, or the month/day. Further, the time may also be recorded.

Figure 25:
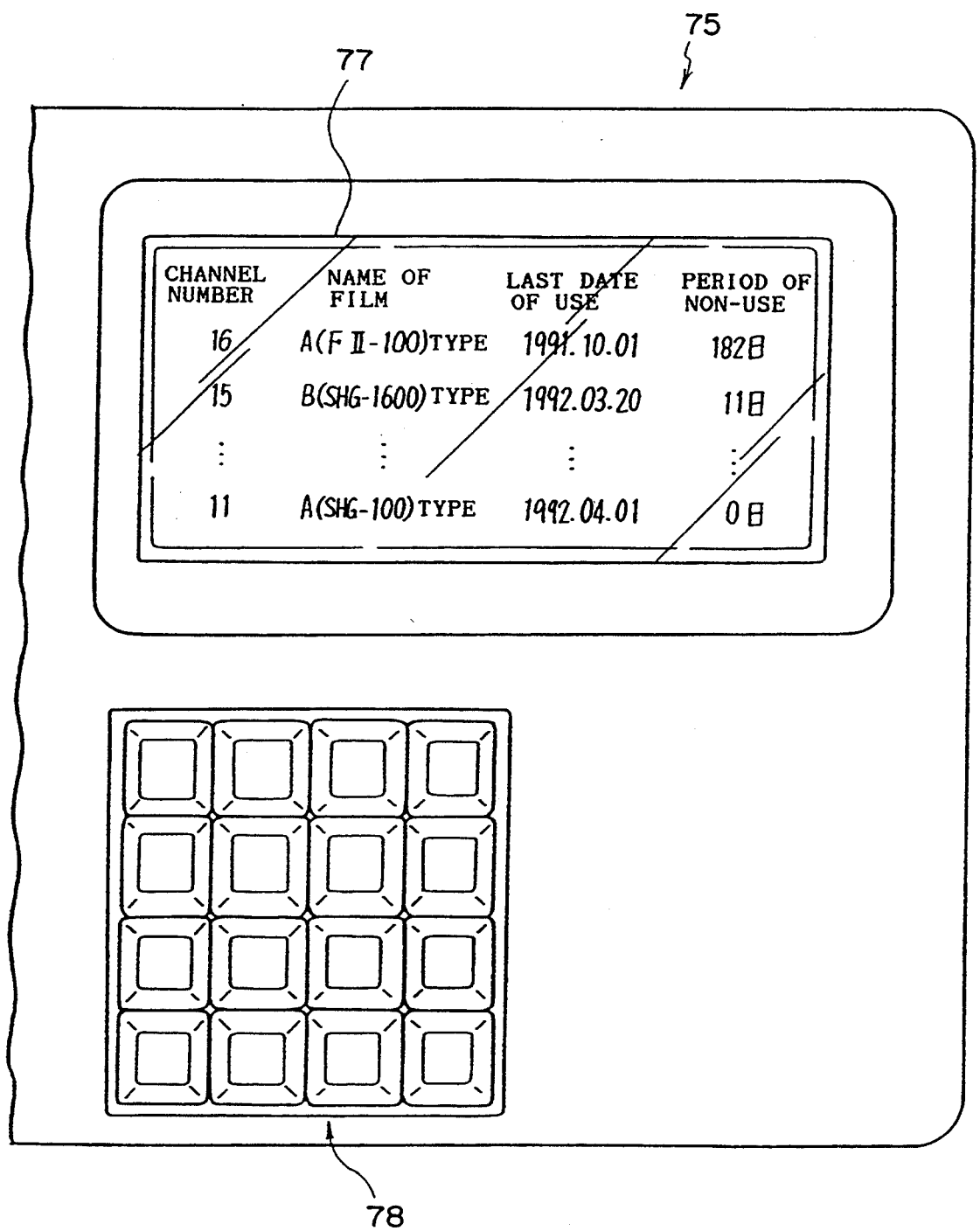
FIG. 25 is a plan view of an operating section, illustrating an example of a case in which stored data is displayed.

When there is no vacant space in the storing means when a new DX code and data corresponding thereto are to be stored, in the third embodiment, the data which has not been used in the longest time is deleted, and in the fourth embodiment, the data which has been used the least frequently is deleted. However, the present invention is not limited to the same. For example, as illustrated in FIG. 25, data may be displayed in order from the data which has not been used in the longest time on a display 77, such as a liquid crystal display or the like, which is provided in an operating section 75 of the photographic printing apparatus. Indicated data may be deleted by an operator by use of a keyboard 78 serving as an indicating means.

The photometric methods, the methods of determining exposure condition and the like used in the above-described embodiments of the present invention may be changed in various ways and are not limited in any way. For example, methods described in Japanese Patent Application Laid-Open Nos. 2-90140, 3-53235 are applicable to the fourth embodiment.

Further, in the above description, the DX code stored on the negative film 20 or on the cartridge 76 which accommodates the negative film 20 is read by the bar code reading device 32, and the film type is determined based on the DX code. However, the present invention is not limited to the same. The film type may be determined by reading information which is stored magnetically or electrically. Further, a determination of the film type may be effected on the basis of results of spectral photometric measurement of the images recorded on the film.

The above description is an explanation of the example in which one printing exposure condition of the reference negative film type is stored and the exposure condition is determined. However, exposure conditions may be stored for each film type, and the actual exposure conditions may be determined by correcting the aforementioned exposure conditions.

Further, the correction values may be calculated from the difference between the film characteristics of the reference film type and the film characteristics of the film type of the film to be printed, i.e., the difference or the ratio of the image densities of both films, or the difference or the ratio of the slopes calculated from the image densities, or the like. Subsequently, the exposure condition may be determined from the reference printing exposure condition, the image density values for the three colors, and these correction values.

Moreover, the features of the third and fourth embodiments may be applied to the first and second embodiments.

What is claimed is:

1. A photographic printing apparatus comprising:
   photometric measuring means for dividing an image frame recorded on a film into a plurality of portions and photometrically measuring the divided portions;
   selecting means for selecting photometric data necessary for determining an exposure condition, from a plurality of photometric data obtained by photometric measuring by said photometric measuring means;
   first storing means for storing data obtained by said photometric measuring of a plurality of rolls of film;
   second storing means for storing data obtained by said photometric measuring of an image frame of a single film upon which an image frame to be printed is recorded;
   weighting factor setting means for setting weighting factors to be applied respectively to selected data of said image frame to be printed, selected by said selecting means, and to data determined from data stored in said first storing means, and to data determined from data stored in said second storing means; and
   exposure condition determining means for determining an exposure condition based on a value obtained from respectively weighted data which are weighted by said weighting factors set by said weighting factor setting means.

2. A photographic printing apparatus according to claim 1, wherein said first storing means and said second storing means store one of photometric data and average values of respective densities of said photometric data as data obtained by said photometric measuring, and said exposure condition determining means uses density data corresponding to densities of said selected data determined from said data stored in said first storing means and said second storing means.

3. A photographic printing apparatus according to claim 1, wherein said selecting means selects data necessary to determine an exposure condition based on data stored in said first storing means.

4. A photographic printing apparatus according to claim 1, wherein said selecting means selects photometric data belonging to a region in which one of a color difference and a color ratio of a standardized value from a reference value on a color coordinate system is small.

5. A photographic printing apparatus according to claim 1, wherein said weighting factor setting means sets said weighting factors such that weighting of data stored in said second storing means becomes larger as an amount of data stored in said second storing means becomes larger.

6. A photographic printing apparatus according to claim 1, wherein said weighting factor setting means changes said weighting factors applied to said data respectively by comparing at least two data among said data stored in said first storing means, said data stored in said second storing means, and said photometric data of the image frame to be printed.

7. A photographic printing apparatus according to claim 1, wherein said weighting factor setting means increases weighting of data determined from data stored in said first storing means when an image frame prone to color failure is to be printed, and said weighting factor setting means increases weighting of data determined from data stored in said second storing means when an image frame whose film characteristics vary is to be printed, and said weighting factor setting means increases weighting of said selected data when an image frame photographed under a heterogeneous light source is to be printed.

8. A photographic printing apparatus according to claim 1, wherein said weighting factor setting means changes said weighting factors applied to said data respectively in accordance with characteristics of said selected data.

9. A photographic printing apparatus according to claim 1, wherein said first storing means stores data per film type obtained by said photometric measuring, and said exposure condition determining means determines an exposure condition by using data corresponding to a film type.

10. A photographic printing apparatus according to claim 1, wherein said first storing means stores data obtained by said photometric measuring in a predetermined storage region and in accordance with a code identifying a film type, and said photographic printing apparatus includes a stored data managing means for automatically setting a storage region when said identifying code is not stored in said first storing means and for automatically deleting said identifying code and stored data when predetermined conditions have been met.

11. A photographic printing apparatus according to claim 1, further comprising:
stored data managing means for storing data, which is obtained by said photometric measuring, in said first storing means per film type, and for corresponding a date when said data was stored or dates when said data was used with a film type, and for storing the date when said data was stored or dates when said data was used, and for deleting data of a predetermined film type based on the date when said data was stored or the dates when said data was used.

12. A photographic printing apparatus according to claim 9, further comprising:
stored data managing means for corresponding a date when said data was stored or dates when said data was used with a film type, and for storing the date when said data was stored or the dates when said data was used, and for deleting data of a predetermined film type based on the date when said data was stored or the dates when said data was used.

13. A photographic printing apparatus according to claim 11, wherein said stored data managing means deletes data of a film type, for which a predetermined period of time has passed since said data was last used.

14. A photographic printing apparatus according to claim 11, wherein said stored data managing means deletes data of a film type, having a longest period of time since said data was last used.

15. A photographic printing apparatus according to claim 11, further comprising:
display means for displaying film types in order based on one of respective dates of storage of said film types and respective dates of use of said film types; and
indicating means for indicating a film type to be deleted;
wherein said stored data managing means deletes data of said film type indicated by said indicating means.

16. An exposure condition determining method, comprising the steps of:
dividing an image frame to be printed into a plurality of portions and measuring photometrically said portions;
selecting photometric data necessary for determining an exposure condition;
setting weighting factors to be applied respectively to said selected photometric data, and to data determined from data obtained by photometric measuring of a plurality of rolls of film, and to data determined from data obtained by photometric measuring of image frames of a single film on which image frames to be printed are recorded; and
setting an exposure condition based on a value obtained from respective weighted data which are weighted by said weighting factors.

17. An exposure condition determining method according to claim 16, wherein said data obtained by photometric measuring of a plurality of rolls of film is classified per film type thereof.

18. An exposure condition determining method according to claim 17, wherein data of a film type, for which a prescribed period of time or longer has passed since said data was last used is deleted.

19. A photographic printing apparatus comprising a storing means and a stored data managing means for managing data stored in the storing means based on the age of the data.

20. A photographic printing apparatus according to claim 19 wherein said stored data managing means associates a date with a data item stored in said storing means.

21. A photographic printing apparatus according to claim 20, wherein said date is the date when the data item was stored.

22. A photographic printing apparatus according to claim 20, wherein said date is the date when the data item was most recently used.

23. A photographic printing apparatus according to claim 19, wherein said stored data managing means associates a plurality of dates with a data item stored in said storing means.

24. A photographic printing apparatus according to claim 23, wherein said plurality of dates includes the date the data item was stored and the date the data item was most recently used.

25. A photographic printing apparatus according to claim 23, wherein said plurality of dates includes the date the data item was stored and a plurality of dates each corresponding to a date when the data was used.

26. A photographic printing apparatus according to claim 19, wherein the data is also managed according to the type of film to which the stored data corresponds.

27. A method for managing storage of photometric data in a photographic printing apparatus, comprising the steps of,
determining if a vacant storage region exists,
if no vacant storage region exists, then selecting data that has been stored for longer than a predetermined period of time, and if no data has been stored for longer than a predetermined period of time, then selecting data to be deleted
deleting the data selected to be deleted,
storing incoming data and management information associated with the incoming data,
storing the date of use for each data item stored, each time the data item is used.

28. A method for managing storage of photometric data according to claim 27, wherein said management information consists of a film type, the date the data is stored, and the dates the data is used.

* * * * *